(12) United States Patent
Al-Qurishi et al.

(10) Patent No.: US 12,499,142 B2
(45) Date of Patent: Dec. 16, 2025

(54) METHOD AND APPARATUS WITH ARABIC INFORMATION EXTRACTION AND SEMANTIC SEARCH

(71) Applicant: Elm, Riyadh (SA)

(72) Inventors: Muhammad Saleh Al-Qurishi, Riyadh (SA); Sarah Ahmed Al-Qaseemi, Riyadh (SA); Riad Souissi, Riyadh (SA)

(73) Assignee: Elm, Riyadh (SA)

( * ) Notice: Subject to any disclaimer, the term of this patent is extended or adjusted under 35 U.S.C. 154(b) by 0 days.

(21) Appl. No.: 18/097,793

(22) Filed: Jan. 17, 2023

(65) Prior Publication Data

US 2024/0012840 A1    Jan. 11, 2024

Related U.S. Application Data

(60) Provisional application No. 63/358,395, filed on Jul. 5, 2022.

(51) Int. Cl.
G06F 16/00 (2019.01)
G06F 16/3332 (2025.01)
(Continued)

(52) U.S. Cl.
CPC ...... *G06F 16/3344* (2019.01); *G06F 16/3334* (2019.01); *G06F 16/35* (2019.01); *G06F 40/295* (2020.01)

(58) Field of Classification Search
CPC .. G06F 16/3344; G06F 16/3334; G06F 16/35; G06F 40/295
(Continued)

(56) References Cited

U.S. PATENT DOCUMENTS 7,529,756 B1 * 5/2009 Haschart ................ G06Q 50/18
11,442,975 B2 * 9/2022 Agnihotram ............ G06F 40/56
(Continued)

FOREIGN PATENT DOCUMENTS

| CN | 111176996 A | * | 5/2020 | |
| CN | 112905764 A | * | 6/2021 | |
| WO | WO-2021092272 A1 | * | 5/2021 | ............. G06F 16/00 |

OTHER PUBLICATIONS

Harvard Law School Library, https://guides.library.harvard.edu/islamiclaw, Wayback Machine, Apr. 13, 2021, 22 pages.*

(Continued)

*Primary Examiner* — Monica M Pyo
(74) *Attorney, Agent, or Firm* — Oblon, McClelland, Maier & Neustadt, L.L.P.

(57) ABSTRACT

An Arabic information extraction apparatus includes one or more processors configured to: receive a query comprising a long query or a short query; extract, using one or more language models, a named entity and a keyword from the query to generate extracted information; classify, using one or more classification models, the query to generate a classified query; convert the classified query and the extracted information into a dense vector representation; and determine and output a similarity match between the dense vector representation and a document vector representation of a knowledge base comprising an Islamic law document.

17 Claims, 38 Drawing Sheets

(51) Int. Cl.
*G06F 16/334* (2025.01)
*G06F 16/35* (2019.01)
*G06F 40/295* (2020.01)

(58) Field of Classification Search
USPC .......................................................... 707/737
See application file for complete search history.

(56) References Cited

U.S. PATENT DOCUMENTS

| | | | | |
|---|---|---|---|---|
| 11,625,615 | B2* | 4/2023 | Neumann | G06F 16/3344 |
| | | | | 706/46 |
| 2006/0248440 | A1* | 11/2006 | Rhoads | G06F 16/93 |
| | | | | 715/236 |
| 2018/0150459 | A1* | 5/2018 | Farid | G06F 16/24578 |
| 2021/0042830 | A1* | 2/2021 | Burke | G06Q 20/341 |
| 2021/0133224 | A1* | 5/2021 | Tiwari | G06F 16/319 |
| 2021/0133251 | A1* | 5/2021 | Tiwari | G06F 40/205 |
| 2021/0133264 | A1* | 5/2021 | Tiwari | H04L 51/02 |
| 2022/0138572 | A1* | 5/2022 | Song | G06F 9/4881 |
| | | | | 706/20 |

OTHER PUBLICATIONS

Li Tang et al., "Searching for legal documents at paragraph level: Automating label generation and use of an Extended Attention Mask for bossting neural models of semantic similarity", Natural Legal Language Processing Workshop 2021, pp. 114-122, Nov. 10, 2021.*

Shohreh Shaghaghian et al., "Customizing Contextualized Language Models for Legal Document Reviews", https://thomsonreuters.com/en/artificial-intelligentce/document-analysis.html, 10 pages, Feb. 10, 2021.*

Muhammad Al-Qurishi, "AraLegal-BERT: A pretrained language model for Arabic Legal text", Proceedings of the Natural Legal Language Processing Workshop 2022, pp. 338-344, Dec. 8, 2022.*

* cited by examiner

وقد نظرت الدائرة هذه القضية في عدة جلسات تحضيرية وفي جلسة 16/2/1425هـ حضر وكيل المدعية ... سبق ضبط بيانات هويته ووكالته في جلسة سابقة كما حضر وكيل المدعى عليها... تم ضبط بيانات هويته ووكالته في ضبط الجلسات

Segmentation

The most important points mentioned in the first query

| Word | Lemma1 | Lemma2 | Lemma3 | Lemma4 | Lemma5 |
|---|---|---|---|---|---|
| أودي | أودى | | | | |
| أعطي | أعطى | | | | |
| وأعطي | أعطى | | | | |
| فأعطي | أعطى | | | | |
| وسموها | سمو | سمى | سم | وسم | |
| تقص | قص | أقصى | تقص | | |
| يدع | ودع | دعا | دع | | |
| ونسق | نسق | سقى | ساغ | | |
| ويسمون | سمى | سما | سم | | |
| يسمون | سمى | سما | سم | | |
| ونفت | نفى | فت | | | |
| يقل | قل | قال | أقال | قلى | قلا |
| ويقل | قل | قال | أقال | قلى | قلا |
| وتوليا | تولي | تولى | أولى | | |
| توليا | تولي | تولى | أولى | | |

FIG. 28

Algorithm 1 Text Preprocessing
Input           : String s
Output          : Processed string s
1 Operations:
   1. Remove html markup Input Example : ولما لم تستجب المدعى عليها لطلب المدعية بالقيام بالتحايل والغش في مستندات البضاعة

< br > قامت المدعية من تلقاء نفسها بقطع المفاوضات

Output Example : ولما لم تستجب المدعى عليها لطلب المدعية بالقيام بالتحايل والغش

في مستندات البضاعة قامت المدعية من تلقاء نفسها بقطع المفاوضات

2. Remove tashkeel (tanween, damma, fatha, shaddah, kasra, sukun).

Input Example : وآله الموفق وصلى الله على نبينا مُحَمَّد وآلهِ وصحبِهِ وسلّم

Output Example : والله الموفق وصلى الله على نبينا محمد واله وصحبه وسلم

3. Remove tatweel //'u0640'

Input Example : لســــا كان من أمره

Output Example : لا كان من أمره

4. Remove duplicated white spaces

Input Example : ملحوظات    المدعية    تحت الدراسة

Output Example : ملحوظات المدعية تحت الدراسة

5. Replace slash with dash

Input Example : بتاريخ 2/3/1443

Output Example : بتاريخ 2 – 3 – 1443

6. Replaces hindi numbers with the corresponding Arabic one

Input Example : ريال ( ١٢١ ) السعر المتفق عليه مع المدعى عليها البالغ

Output Example : ريال (121) السعر المتفق عليه مع المدعى عليها البالغ

7. Remove non Arabic digits

8. Apply segmentation

FIG. 29

| | | Result example: |
|---|---|---|
| "،"Case_No." "رقم القضية،" "،"Case_No." "رقم،" "،"primitive_verdict_No." "الحكم الابتدائي،" "،"primitive_verdict_No." "القرار الابتدائي،" "،"primitive_verdict_No." "حكم،" "،"Audit_Authority_verdict_No." "هيئة التدقيق،" "،"Appeal_verdict_No." "رقم حكم الاستئناف،" "،"hearing_date" "تاريخ الجلسة،" "،"Appeal_verdict_No." "حكم الاستئناف،" "،"Appeal_hearing_date" "تاريخ جلسة الاستئناف،" "،"Appeal_verdict_No." "حكم الاستئناف،" "،"Appeal_verdict_No." "الحكم الاستئنافي،" "،"Appeal_case_No." "قضية الاستئناف،" "،"Appeal_case_No." "قضية،" "،"Appeal_case_No." "قضية حكم" | "،"verdict_No._GDFMC" "رقم قرار الهيئة الصحية الشرعية،" "،"verdict_No._GDFMC" "القرار الهيئة الصحية الشرعية: قرار الهيئة الصحية الشرعية،" "،"verdict_No._GDFMC" "القرار الابتدائي،" "،"verdict_No._GDFMC" "القرار الابتدائي: قرار الهيئة الصحية الشرعية،" "،"hearing_date" "تاريخ الجلسة،" "،"hearing_date" "،"hearing_date" "،"Audit_Authority_verdict_No." "،"Audit_Authority_verdict_No." "،"Appeal_case_No." "قضية الاستئناف،" "،"verdict_No._GDFMC" "رقم قرار الهيئة الصحية،" "،"Audit_Authority_verdict_No." "رقم حكم هيئة التدقيق،" "،"Audit_Authority_verdict_No." "قرار هيئة التدقيق،" "،"MVC_verdict_No." "قرار لجنة النظر في المخالفات الطبية،" | {'Audit_Authority_verdict_No.': ['.55-1'], ['.281-4'], 'Audit_Authority_verdict_No.date': ['5141'], 'hearing_date': [61/9/5141], 'primitive_verdict_No.': ['.55-1'], 'primitive_verdict_No.date': ['5141'], 'Case_No.': ['.9791-1'], 'Case_No.date': ['1141']} |

FIG. 30

| Hadith Book | Hadith Explanation Book |
|---|---|
| صحيح مسلم | كتاب شرح النووي على مسلم |
| سنن النسائي | شرح سنن النسائي للشنقيطي |
| سنن ابن ماجة | مشارق الأنوار الوهاجة ومطالع الأسرار البهاجة في شرح سنن الإمام ابن ماجه |
| موطأ مالك | شرح الموطأ - عبد الكريم الخضير |
| سنن ابي داوود | معالم السنن |
| مسند احمد | الفتح الرباني لترتيب مسند الإمام أحمد بن حنبل الشيباني |
| جامع الترمذي | شرح جامع الترمذي - الراجحي |

FIG. 31

| BoG Categories | BoG Subcategories | MoJ Categories | MoJ Subcategories |
|---|---|---|---|
| الشركات | حل وتصفية شركة مضاربة... | حقوقي | ألعاب محاكاة.. |
| التزوير والرشوة | محرر رسمي ورشوة... | جنائي | حادث مروري بليغ.. |
| عقد | عقد صيانة وإيجار نزع ملكية عقار.. | الإحوال الشخصية | مطالبة بيت المال |
| استغلال النفوذ والوظيفي | رجل أمن موظف عام | | |
| تجاري | توزيع ووكالات تجارية قضية تجارية | | |
| ثقافة | تقاعد مدني تقاعد عسكري | | |
| تعليم | قرارات وظيفية وظائف تعليمية | | |
| ملكية فكرية | حقوق المؤلف وبراعة الإختراع | | |
| خدمة مدنية وعسكرية | حوافز وأنظمة خدمة مدنية .. | | |
| مؤسسات ومهن صحية | خطأ طبي، مؤسسات صحية خاصة | | |

FIG. 32

| | |
|---|---|
| Legal Bond-Hadith | قال رسول الله صلى الله عليه: "قليس يحل لمسلم من أخيه شيء إلا ما حل له من نفسه" |
| Legal Bond-Quran | قال تعالى: "لا يحل لكم أن ترثوا النساء كرها ولا تعضلوهن لتذهبوا ببعض ما آتيتموهن" |
| Legal Bond-jurisprudence | الإصرار لا يبطل حق الغير |
| Law | المادة 3 من قانون الأحوال الشخصية |
| Job | القاضي |
| Organization | محكمة الجنايات |
| Person | عبد الكريم |
| Address-loc | طريق صبيا |
| Documents | شيك |
| Judgment (verdict) | إلزام المدعى عليه بالتعويض |
| Accusation | سرقة |
| Evidence | اعترف المتهم بالإشارة |
| Citation | لحكم الصادر أقل خلال |
| Periods | عامين |
| Currency | ريال |
| Nationality | سعودي |
| Amounts | كيلو |
| Dates | 2007 |

FIG. 33

METHOD AND APPARATUS WITH ARABIC INFORMATION EXTRACTION AND SEMANTIC SEARCH

CROSS-REFERENCE TO RELATED APPLICATIONS

This application claims the benefit under 35 USC 119(e) of U.S. Provisional Application No. 63/358,395 filed on Jul. 5, 2022, the entire disclosure of which is incorporated herein by reference for all purposes.

BACKGROUND

1. Field

The following description relates to a method and apparatus with Arabic information extraction and semantic search.

2. Description of Related Art

Typical Arabic search engines for legal texts lack identical searches, making the search process weak in retrieving information the researcher needs, such as semantic search information. Typical engines may not link related issues of laws, rulings, and legal references such as state decisions, texts of the Quran and Hadith, rules of jurisprudence applicable in local Law, and international agreements. The search process in these engines may be done using specific keywords or parts of sentences, but not paragraphs or entire case documents. In these search engines, there may be no indication of how closely a query matches the results. Typically, if the query words do not precisely match what is in the database, there would not be a match. Thus, there is a lack of an extraction method that allows for extracted information to be presented appropriately so that the essence of the retrieved cases can be quickly determined by a user, e.g., a judge or legal researcher.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an Arabic information extraction apparatus includes one or more processors configured to: receive a query comprising a long query or a short query; extract, using one or more language models, a named entity and a keyword from the query to generate extracted information; classify, using one or more classification models, the query to generate a classified query; convert the classified query and the extracted information into a dense vector representation; and determine and output a similarity match between the dense vector representation and a document vector representation of a knowledge base comprising an Islamic law document.

The Islamic law document may include a Quran document and a Hadith document.

The one or more processors may be further configured to: collect raw data and explanations of the Quran document from online sources; parse the raw data of the Quran document into chapters using a predetermined phrase; bind determined verses of the chapters to corresponding verse explanation of the explanations; and convert the Quran document, the Hadith document, and the bound determined verses into document vector representation.

The predetermined phrase may include "In the name of Allah, the Merciful."

The knowledge may further include at least one of legal cases, legislative laws, royal decrees, laws, Arabic Legal Content (ALC) raw data, or Sharia ruling documents, or any combination thereof, into the document vector representation.

At least one of the one or more classification models may include a segmentation layer configured to segment and output sentences of the long query into context sentences.

At least one of the one or more classification models may include a semantic layer configured to determine and output similarity matches between sentences of the long query.

The one or more processors may be further configured to extract the keyword by segmenting the long query into word groups with a predetermined number of words to generate word candidates; embed the word candidates and compare their proximity to embeddings of the long query; and generate the extracted information based on a result of the comparison.

The Arabic information extraction apparatus may further include a memory configured to store instructions. The one or more processors may be further configured to execute the instructions to configure the one or more processors to receive the query, extract the named entity and the keyword from the query to generate the extracted information, classify the query to generate the classified query, convert the classified query and the extracted information into the dense vector representation, determine and output the similarity match between the dense vector representation and the document vector representation of the knowledge base.

The long query may have a maximum of 4500 words or 15 pages of texts, and the short query may include a specific word.

The named entity may include any one or any two or more of "Legal Bond-Hadith," "Legal Bond-Quran," "Legal Bond-jurisprudence," "Law," "Occupation," "Organization," "person," "Address," "Documents," "Verdict," "Accusation," "Evidence," "Citation," "period," "currency," "nationality," "amount," and "date."

The one or more language models may include a named entity recognition model including plural layers, a first layer of the plural layers including pre-trained models, a second layer of the plural layers including a fully connected linear layer configured to receive an output of the pre-trained models, and a third layer of the plural layers being a conditional random fields (CRFs) layer configured to receive an output of the second layer.

The classified query may include a category and a subcategory, and the subcategory is a subdivision of the category.

The classified query may include a case category and a case class subcategory that is a subdivision of the case category.

The keyword may include any one of "themes and facts," or "the circuit ruled."

In another general aspect, an Arabic information extraction method includes receiving a query comprising a long query or a short query; extracting, using one or more language models, a named entity and a keyword from the query to generate extracted information; classifying, using one or more classification models, the query to generate a classified query; converting the classified query and the extracted information into a dense vector representation; and determining and outputting a similarity match between the dense vector representation and a document vector representation of a knowledge base comprising an Islamic law document.

The Islamic law document may include a Quran document and a Hadith document.

The knowledge base may further include at least one of legal cases, legislative laws, royal decrees, laws, Arabic Legal Content (ALC) raw data, or Sharia ruling documents, or any combination thereof, into the document vector representation.

At least one of the one or more classification models may include a segmentation layer configured to segment and output sentences of the long query into context sentences.

A non-transitory computer-readable storage medium may store instructions that, when executed by one or more processors, configure the one or more processors to perform any of the method disclosed herein.

Other features and aspects will be apparent from the following detailed description, the drawings, and the claims.

BRIEF DESCRIPTION OF THE DRAWINGS

FIG. 3B is a flow diagram illustrating an example of text segmentation.

FIG. 25 are diagrams of an example of searching by a long document query.

FIG. 27 illustrates an output from a tokenization.

FIG. 28 shows an example of Lemma of Arabic words.

FIG. 29 shows the operations of text preprocessing.

FIG. 30 a process of translating and reformulating the identification numbers.

FIG. 31 lists Hadith Books and Hadith Explanation Books.

FIG. 32 shows examples of categories and subcategories.

FIG. 33 example model, there are 18 NE classes.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
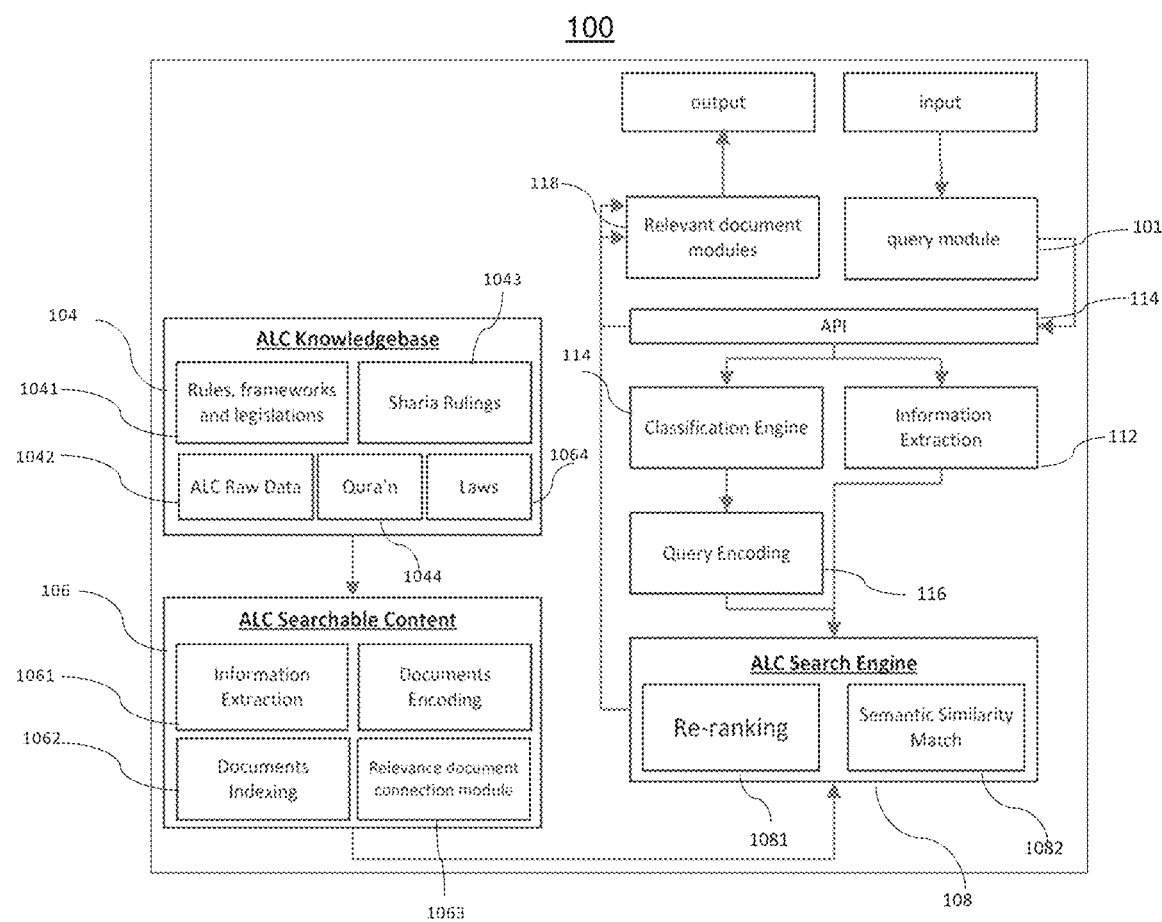
FIG. 1 illustrates an example of an information extraction and semantic searching system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the FIG.s. Such spatially relative terms are intended to encompass different orientations of the device in use or operation in addition to the orientation depicted in the FIG.s. For example, if the device in the FIG.s is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Typical systems and methods for legal case searches are not tailored to the Arabic language. For example, natural language processing (NLP) models developed for other languages are not easily adaptable to the Arabic language due to specific features of the Arabic language.

For example, Arabic is one of the most morphologically rich languages, which complicates training traditional word embedding algorithms as a model would have to learn a completely new embedding for each language morphology.

Additionally, there is a lack of freely available Arabic datasets, and gazetteers, as many of the available ones are not appropriate for Arabic NER tasks because of the absence of NEs annotations.

Many annotated data are needed to train a language for a specific task using machine learning. The lack of resources requires much work in collecting, preprocessing, and cleaning the data. The quality of the results depends on the quality of the algorithms and the amount of data available to them.

Morphologically complex: In classical and colloquial Arabic, a very complex morphological system results in many morphological structures. From the root of a word, words that are different lexically and semantically can be derived. For example, the verb "سيكتبونها" is one of about 5,400 conjugations for the verb "كتب" Another example, the words "madrassa" and "modarissa" are extracted from the root "d-,r-,s- درس,," which is written in the same way in Arabic مدرسة but with different meanings (madrassa=school, modarissa=educator). Such ambiguity can affect the performance in Arabic NER as features are typically derived from the suffix and prefix of a word. Also, spelling alternates can be a challenge in Arabic NER.

Due to Arabic's morphological density, it may be desirable to evaluate the performance of different tokenization schemes using various tasks.

The Arabic language structure is highly agglutinative, with a lack of vowels replaced with diacritics; thus, a missing letter creates ambiguity. For example, the word "وحده" has more than 200 analyses distributed over 12 lexical entries in the Arabic analysis system "كلمـسـتار" which is based on the "سامـا" system of Arabic morphology. Among these analyses, we find "وَحْدَه ", و "وَحُدَ+هُ" ، "وَحْدَ+هُ" ، "هُ + حَدَّ +وَ" and "the last example is considered a misspelling of the entered word" this makes the Arabic text is far from being an easy language to read by other language systems.

NLP tools developed for Western languages are not readily adaptable to Arabic due to the specific features of the Arabic language.

Crude Arabic-to-English translations cannot be relied upon as sufficient preprocessing before applying sophisticated English NLP methods; much is lost in translation.

Unlike English and other European languages, capitalization does not exist in Arabic script. In English and other European languages, named entities can be identified by capitalization; in Arabic, this feature is absent, making the task harder.

Arabic can be ambiguous; for instance, many named entities are used as common nouns and adjectives. In addition, words (including named entities) may be spelled differently but have the same meaning generating a many-to-one ambiguity.

Arabic is a pro-drop language. It allows subject pronouns to drop the subject to the recoverability of deletion.

The cursive nature of Arabic makes it difficult to recognize the stem from the added morphemes. Such features of Arabic texts challenge tokenization in many tasks.

The Arabic language is a language of weights, as are most Semitic languages, unlike the English language, which depends on adding and removing suffixes to grammatical inflection.

An example of this in the past tense verb in the English language is the addition of the suffix (ed), considering the special cases, and in turn, it is the weight of the word over the weight of the triple (فَعَل):

Help→helped

أكل ←— مأكولات

It seems from the above that adding and removing suffixes is effective in the English language and ineffective in the Arabic language.

For the sake of justice with the Arabic language, yes, there are very famous and frequently used suffixes such as plural, SentencePiece, and possessive suffixes, but all this is not enough to express a context or to cut a word to its origin by the existing algorithms.

For example, how will the letter " و " be extracted from the word "مأكولات"?

Here is the problem with the BERT tokenizer; Cutting 512 words results in more than this number of syllables, with data distortion.

For example, FIG. 27 shows for text containing 512 words, the output of the tokenization process:

From the previous example, we can see that Arabic is different from any other Latin language The Arabic legal language is more complicated than the Arabic language itself.

For this reason, we have built our own language model from scratch for Arabic Legal Information extraction.

Arabic texts include many translated and transliterated named entities whose spelling, in general, tends to be inconsistent in Arabic texts. For example, a named entity such as the city of Washington could be spelled وشنطن، واشنغطن، واشنطن، واشنجن

Arabic NLP applications must deal with several complex problems pertinent to the nature and structure of the Arabic language. For example, Arabic is written from right to left.

Arabic, however, exhibits an actual diglossic situation where at least three varieties of the same language are used within a speech community and in circumscribed cases. For example, Modern Standard Arabic (MSA) is the language of official documents, newsletters, and education. Traditionally, it is the same language by all Arabs. In addition, people use colloquial or dialectal Arabic in informal settings to communicate daily.

It is challenging and almost impossible for an ANLP single application to process data from all the varieties of Arabic because each type has its grammar, lexicon, and morphology, even though they have some properties in common.

Arabic writing is not typically understood unless its letters are connected. Unfortunately, some letters do not accept the connection, as there is a relatively short distance between them and adjacent letters in the same word. Therefore, separating words from one another is not trivial. In commercial systems for Arabic letter recognition software, about 10% of the errors at the word level originate when separating the words from each other, even when the document is clear.

The Arabic word—in which you must write many letters connected—makes the issue of recognizing the letters of these words more complicated than the recognition of texts written in Latin languages, for example, where all their letters can be written separately from each other (which is often the case in typing). This adds another challenge to the technology of converting printed Arabic speech into readable texts.

There is no known system for searching for Arabic cases based on legal evidence from the Holy Quran, the Noble Hadith, or Sharia rules. Cases and their rulings depend not only on the text of this legal evidence but also on their interpretation, which includes many complications.

The nature of existing case documents and their contents pose a real challenge. A massive amount of data is available in an unstructured format, which needs a more flexible system to manage unstructured and vital data related to court operations and cases. For example, for the Arabic language, software that can recognize and understand text, assist in redacting sensitive information, turn unstructured data into structured, and manage the data may be desired. Consequently, the accuracy of the processed data will pose a challenge because the system should be able to capture regularities in textual structures (words, phrases, and documents). In terms of queries input by a user, for example, a judge, the system should be able to utilize and enrich the short context-less text with contextual features and real-world knowledge, as well as handle the long query to get the semantic meaning. Many manual annotations and classifications are needed, and no training datasets are available for such a system.

For example, the systems and methods include the following AI models: Semantic Search based on a Deep bi-directional transformers autoencoder, Text classification, Named Entity Recognition (NER), and Word Stemming.

Each of these AI models may work together algorithmically to analyze a massive amount of Arabic Legal text corpus, index, and store them in a knowledge base.

The disclosed method and apparatus may help narrow the search space and help make the retrieving process more efficient, and help extract Arabic legal information, terms, conditions, as well as more than 15 Arabic, Named Entities from unstructured data and convert them to structured using the Arabic transformer-language model and deep learning.

The current disclosure introduces a system and methods for semantic search of Arabic Legal Cases (ALC) from a knowledge base and retrieving similar cases, related laws, regulations, frameworks, and religious references that are needed when a judge or a lawyer wants to have a decision in a particular case. In addition, our system may search structured and unstructured data of ALC based on the entered query with the help of extracted information.

The query can be a short query or a long document query. In addition, the user can specify the way of searching if to search on all documents or only based on basic categories or subcategories.

Figure 2A:
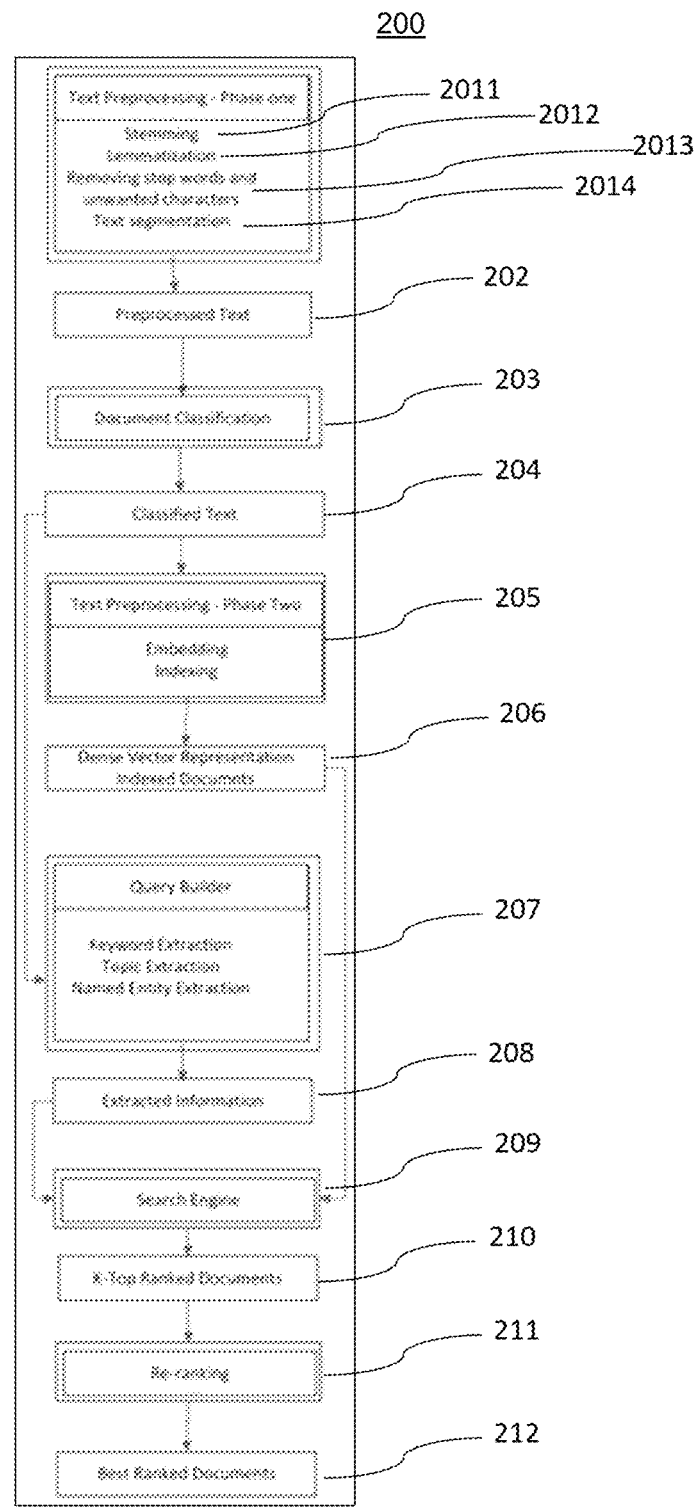
FIG. 2A illustrates an example of a method for information extraction and semantic searching.
Figure 2B:
FIG. 2B illustrates an example of word stemming.
Figure 2C:
FIG. 2C illustrates an example of part of speech (PoS).

FIGS. 1 and 2 are examples of information extraction and semantic searching system 100. The information extraction and semantic searching system 100 may enable an end-user (e.g., a lawyer or judge) to submit a short or long query to a query module 102. A long query may be a long text with a maximum of 4500 words or 15 pages, for example. For example, a short query may be a short text using a specific word.

An application programming interface (API) bus 110 may be used between the query module 102, the relevant document module 118, the information extraction module 112, and the classification engine 114. The information extraction module 112 may extract information from the documents in the searchable content, such as keywords and named entities used in the query expansion, to improve the searching process. The classification engine 114 may classify the short and long queries into categories and subcategories. A query encoding module 116 may convert the output of the classification engine 114 and the extracted information from the information extraction module 112 into a dense vector representation.

An ALC search engine 108 may be used to process the output of the query encoding module 116. The ALC search engine 108 may include a re-ranking module 1081 and a semantic similarity match module 1082. The semantic similarity match module 1082 may be used to find similarities between the entered long or short query and indexed documents to get Top-K documents. The re-ranking module 1081 may be used to enhance relevancy by re-ranking the Top-K documents to get the best-ranked documents.

The information extraction and semantic searching system 100 may allow Arabic Legal Cases (ALC) in an ALC knowledge base 104 to be searched for related cases using the query module 102. For example, the ALC knowledge base module 104 may include rules, frameworks, and legislations 1041, ALC raw data 1042, Sharia rulings 1043, Quran 1044, and Laws 1045.

The ALC knowledge base 104 may include structured and unstructured data that may be searched for cases and texts relevant to legal cases that occurred in the same year, city, organization, or controlled with the same Law, Hadith, Fiqh, and/or Ayah from Quran to create a searchable content.

The searchable content from the ALC knowledge base module 104 may be processed using an ALC searchable content module 106. The ALC searchable content module 106 may include information extraction module 1061, document indexing module 1062, relevant document connection module 1063, and document encoding module 1064. The information extraction module 1061 may extract information from the documents in the searchable content, such as keywords and named entities used in the query expansion, to improve the searching process. The document indexing module 1062 may be used to index documents in searchable content. The relevant document connection module 1063 may be used to save the knowledge base tables of the searchable content into a database, e.g., a relational database. Finally, the document encoding module 1064 may convert the documents of the searchable content into a dense vector representation.

The ALC search engine 108 may process the output of the ALC searchable content module 106.

FIG. 2 illustrates an example of a method for information extraction and semantic searching 200.

In FIG. 2, after a user enters a long or short query, the information extraction and semantic searching system 100 may go through a pre-processing phase, document classification phase, information extraction phase, and search engine phase to process the long or short query by training several deep neural networks to get the desired search result.

The text preprocessing stage 201 may include stemming, lemmatization, removing stop words and unwanted characters, text segmentation, indexing, and building document embedding.

The preprocessed text 202 output from the text preprocessing stage 201 may be formatted text classified in a document classification operation 203 by a classification model into main classes and sub-classes.

The classified text 204 may go through the second phase of the text pre-processing stage 205 for embeddings and indexing. The text pre-processing and document classification phases may be performed once for the knowledge base and every query.

The output of the indexing and embeddings from the text pre-processing stage 205 and the classified text 204 are input into the information extraction stage 207. The information extraction stage 207 builds a query by combining the extracted information and embeddings. For example, the extracted information 208 from the information extraction stage 207 may include a keyword extraction at the document level, named entity extraction at the document level, and legal information at the document level.

The output of the text pre-processing stage 205 may be input into a dense vector representation of the documents 206 operation for indexing.

The output from the extracted information 208 and the dense vector representation of the documents 206 operation may pass through a search engine 209 operation to generate Top-K documents 210 to find similar documents as a ranked list, before re-ranking operation 211 that may be presented to a user by a best-ranked document 212 operation.

In an example, to enhance the search result, there may be a query expansion process to extract legal information such as named entities, keywords, and key phrases from the entered query. The text query and the extracted information may then be converted into a dense vector representation that may be helpful in the vector-based search. For example, typical keyword searches struggle with complex queries or words with a dual meaning, long queries, field jargon, or exploratory search.

On the other hand, the information extraction and semantic searching system 100 vector-based search can handle these challenges by finding a numerical representation of text queries using state-of-the-art language models, indexing them in a high-dimensional vector space, and measuring the similarity of a query vector to the indexed documents. By getting the dense vector representation, the query may be ready for searching on similar documents on the ALC Searchable content.

In further detail, in an example, the text preprocessing stage 201 may be used to pre-process Arabic legal text by stemming 2011, lemmatization 2012, removing stop words and unwanted characters 2013, and text segmentation 2014.

In the stemming process 2011, Arabic morphological rules may be used to extract stems and lemmas from Arabic text, for example. The Arabic morphological rules may include any one or any combination of any two or more of Arabic-English lexicon files, comprising: prefixes (299 entries); suffixes (618 entries); stems (82,158 entries representing 38,600 lemmas); morphological compatibility tables; prefix-stem combinations (1,648 entries); stem-suffix combinations (1,285 entries); and prefix-suffix combinations (598 entries).

Arabic morphological analysis algorithm may assume that words are made up of prefixes, stems, and suffixes.

An example of word stemming where the sentence is tokenized into words and then reduced each word into a word stem that affixes to suffixes and prefixes or the roots of words:

Prefixes may include 0-4 characters, for example:

| ادنة | جذع | لاقة | suffix | stem | prefix |
|------|-----|------|--------|------|--------|
|      | وبكلهم |   |        | wbklhm |      |
| و    | بكل |      |        | bklhm | w     |
| وب   | كل  |      |        | klhm  | wb    |
|      |     |      |   :    |  :    |       |
| وبك  | ل   | هم   | hm     | l     | wbk   |
|      |     |      |   :    |       |       |
| و    | بكل | هم   | hm     | wbkl  |       |
|      |     |      |        |       |       |
|      | و   | بكلهم | bklhm  | w     |       |

Stems may include an unlimited number of characters, and suffixes may include 0-6 characters.

For example, using the phrase "وبكلهم"wbklhm, the search process in an Arabic dictionary consists of the following questions: is the prefix present in the dictionary of prefixes? If so, is the stem in the stem dictionary? If so, is the suffix present in the dictionary of suffixes?

Part of Speech (POS) tagging is an NLP task marking a word in a text corresponding to a particular part of speech based on its definition and context, noun, verb, adverb, etc. An example of part of speech (POS):

An example of prefixes dictionary:

|   |      |         | ; conjunctions |
|---|------|---------|----------------|
| W | wa   | Pref-Wa | and <pos>wa/CONJ+</pos> |
| F | fa   | Pref-Wa | and; so <pos>fa/CONJ+</pos> |
| ; |      |         |                |
|   |      |         | ; prepositions |
|   |      | ; incompatible with noun suffix categories that are "nominative" | |
| B | bi   | NPref-Bi | by; with <pos>bi/PREP+</pos>< |
| k | ka   | NPref-Bi | like; such as <pos>ka/PREP+</pos> |
|   |      |         | ; concatenations |
| wb | Wabi | NPref-Bi | and + by/with <pos>wa/CONJ+bi/PREP+</pos> |
| fb | fabi | NPref-Bi | and + by/with <pos>fa/CONJ+bi/PREP+</pos> |
| ... |    |         |                |
| ... |    |         |                |

The first column contains the actual string searched for, and the second column contains an audio version of the same string. The third column contains the morphological category, as explained further as follows:

| | | | |
|---|---|---|---|
| hmA | humA | PVSuff-0ah | he/it <verb> them (both) <pos>+(null)/PVSUFF_SUBJ:3MS+humA/PVSUFF_DO:3D</pos> |
| Hm | hum | PVSuff-0ah | he/it <verb> them <pos +(null)/PVSUFF_SUBJ:3MS+hum/PVSUFF_DO:3MP</pos> |
| hA | hA | PVSuff-0ah | he/it <verb> it/them/her <pos>+(null)/PVSUFF_SUBJ:3MS+hA/PVSUFF_DO:3FS</pos> |
| hn | hun~a | PVSuff-0ah | he/it <verb> them <pos>+(null)/PVSUFF_SUBJ:3MS+hun~a/PVSUFF_DO:3FP</pos> |

. . .

Finally, the fourth column contains a corresponding English dictionary translation and part-of-speech information for component formations.

The prefix dictionary contains single prefixes (wa-, fa-, li-, Al-, bi-, etc.) and also all valid prefix strings (waAl-, biAl-, wabiAl-, etc.), and the same applies to the dictionary of suffixes: (-ap, -At, -Ani, -athu, -Athum, -Anihi, -tu-muwhA, etc.).

An example of suffixes dictionary:

| | | | |
|---|---|---|---|
| . . . | | | |
| | | ; ; qariyb_1 | |
| qryb | qariyb | Nall | near; close <pos>qariyb/ADJ</pos> |
| | | ; ; qariyb_2 | |
| qryb | qariyb | N-ap | recent; soon <pos>qariyb/ADJ</pos> |
| | | ; ; qariybAF_1 | |
| qryb | qariyb | NF | recently; soon <pos>qariyb/ADV</pos> |
| | | ; ; qariybAF_2 | |
| qryb | qariyb | NF | closely; near <pos>qariyb/ADV</pos> |
| | | ; ; qariyb_3 | |
| qryb | qariyb | N | relative |
| >qrbA' | >aqoribA' | N0_Nh | relatives |
| AqrbA' | >aqoribA' | N0_Nh | relatives |
| >qrbA& | >aqoribA& | Nh | relatives |
| AqrbA& | >aqoribA& | Nh | relatives |
| >qrbA} | >aqoribA} | Nhy | relatives |
| AqrbA} | >aqoribA} | Nhy | relatives |
| . . . | | | |

Here is an example from the stems dictionary for the word (قريب)-lines beginning with ";;" containing a lemma.

In an example, the algorithm may work as follows:

If all three elements (prefix, stem, and suffix) are found in their respective dictionaries, use their respective morphological classes (string in column 3) to determine if they are compatible.

| prefix | stem | suffix |
|---|---|---|
| | njyb | |
| | njy | b |
| | nj | yp |
| | n | jyb |
| : | : | : |

| prefix | stem | suffix |
|---|---|---|
| n | jyb | |
| nj | yb | |
| njy | b | |

If so, determine whether the morphological category of the prefix is compatible with the morphological category of the suffix. Suppose the morphological category of the prefix is compatible with the morphological category of the suffix. Is the morphological category of the stem compatible with the morphological category of the suffix? If the answer to the last question is "yes," then the morphological analysis is correct. After all this, we get a set of morphologically acceptable solutions Example of morphological analysis using: word (نجيب)
Input: Najeeb
Conversion to Latin letters: njyb
Word segmentation suggested solutions from the algorithm, including an example of a rejected solution and an acceptable solution:
a. na jayob—(نُجَيْبُ)
b. na ( ) IVPref-nHn-na lv1p+ we +jayob (jyb) Ndu Noun pocket;purse+( ) Suff-0
c. najiyb—(نَجِيب)
d. ( ) Pref-0+najiyb (njb) N/ap Noun noble; excellent +( ) Suff-0

The second solution is acceptable because all three components ( )+najiyb+( ) are in their respective dictionaries.

The morphological categories of all three components are listed as compatible pairs in the relevant compatibility tables:

| ( ) najiyb ( ) | njb | Pref-0 N/ap Suff-0 | Noun noble;excellent |
|---|---|---|---|

| | |
|---|---|
| Pref-0 N/ap | listed in the table of compatible prefix-stem morphological categories |
| N/ap Suff-0 | listed in the table of compatible stem-suffix morphological categories |
| Pref-0 Suff-0 | listed in the table of compatible prefix-suffix morphological categories |

In a lemmatization process 2012, similar forms of words in a text may be determined for preprocessing in an NLP system.

For example, using Arabic written language, lemmatization is not trivial due to the rich morphology and lexical ambiguity due to the absence of short vowels.

Table 1 in FIG. 28 shows Example of Lemma of Arabic words

In the process of removing stop words and unwanted characters 2013, for example, removing the stop words is used as one of the preprocessing operations by removing words that appear commonly across all the documents in the corpus.

Examples of the stop words may include prepositions, interjections, adverbs, unions, pronouns, introductory words, numbers from 0 to 9 (unambiguous), other frequently used officials, independent parts of speech, punctuation, symbols such as اجل بعد بعض اثر ا ، ،.

Example of a Process to Remove Markup

Algorithm 1 in FIG. 29 Describe the Operations of Text Preprocessing

Text segmentation 2014 is a process of splitting long texts into sentences with complete meaning, noting that the texts may be formal legal, and eloquent. Sentence texts, for example, long texts, are relatively long and lack punctuation marks, which is a typical method for splitting texts from other languages. In an example, conjunction words are used for segmenting the Arabic language.

A conjunction word is a word that connects two sentences to achieve coherence between sentences and express several different concepts and thus give meaning to speech.

Example of a conjunction word:

a. جلسة 1425/2/16هـ حضر وكيل المدعية ... سبق

وقد نظرت الدائرة هذه القضية في عدة جلسات تحضيرية وفي

وكيل المدعى عليها... تم ضبط بيانات هويته ووكالته في

ضبط بيانات هويته ووكالته في جلسة سابقة كما حضر

ضبط الجلسات b. An example of this letter "كما" is a letter between two sentences complete with meaning and is used frequently in legal texts.

In a non-limiting example, 1200 conjunction words were extracted and used as delimiters for text segmentation.

The conjunction words were extracted from real legal text manually through a lengthy recursive procedure that will be further explained in the extraction of conjunction words.

Long and short Arabic document classification—a classification engine may classify the documents and queries into the proper categories and subcategories. The classification may accelerate the search process by reducing the search area. The categories may include a case category, for example, intellectual property, and the subcategories may include a case class subcategory that is a subdivision of the case category, for example, patents, copyrights, and trademarks.

Figure 3A:
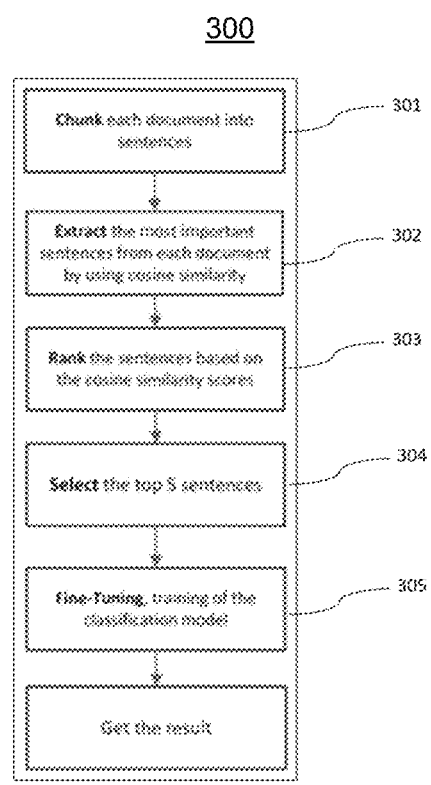
FIG. 3A is a flow diagram illustrating an example of a long or short Arabic document classification.

FIG. 3 is a flow diagram illustrating an example of a long or short Arabic document classification 300.

In a chunking process 301, the long or short Arabic document classification 300 process may include chunking each document into sentences to limit the number of sentence tokens to a predetermined size. For example, each sentence may be limited to 100 tokens or less, for example. Then, an extraction process 302 of extracting important or desired sentences from each document by applying a comparison may be performed. In an example, the comparison may be a cosine similarity. In a ranking process 303, selected sentences may be ranked based on the similarity scores. In a selection process 304, Top-K sentences may be selected to have a predetermined number of tokens. For example, the predetermined number of selected tokens may be 500 or fewer. In a fine-tuning process 305, training the classification model by fine-tuning with respect to the dataset may be performed to get the result.

Process of Classification

To prepare data for the classification process, to have ALC data, data is collected, scraped, and parsed it into structured data from PDF files, for example. Noise may be removed from the data. While issues with adjoining words may exist, Hindi and Arabic digits are used for the classification. The data may be parsed into metadata, legal text, verdict, and appeal verdict.

The processing operations may include partial manual processing, and may include reading text extract functional patterns adjoining words, for example, قاضي الاستئناف - رفعت الجلسة - وعين حردين - هبة الله

The idea of the first two examples is that at first glance, the spelling seems correct because some Arabic letters do not join the following letters, such as (د، و، ة), so if it was the last letter of the word, a writer might forget to add space.

Parsing and Structuring Data

Parsing and structuring data may be done by finding the pattern (form) of the written raw data. This stage may identify the form of the data, e.g., cases, and how they are divided when extracting them from PDF files, for example, into texts. In an example of a legal case, the expectations were to find the legal text of the case, the summary, the verdict passed . . . , etc.

An example of parsing and structuring data:
a. 50 sample cases were read to get acquainted with the form of cases, and it was determined that the cases were divided into:
   i. Set of identification numbers;
   ii. Summary;
   iii. Topics;
   iv. legal provisions; and
   v. Court verdict.
b. The sections to be extracted were determined based on this initial reading.
c. The data was split with the following words in order (for each case separately): الدائرة حكمت الوقائع الموضوعات
   i. Most cases were split into the targeted sections, but 804 cases did not split because some sections were in the wrong order, some were missing, and some contained texts of more than one case and were scattered.
d. In the process of parsing the data after repairing and converting the data into a structured table, the texts were divided each time into two parts:
   i. Dividing the case with the word "الموضوعات" produced:
      1. identification numbers (first column)-metadata-
         a. Case without identification numbers
      ii. Dividing the case without the identification numbers with the word "الوقائع" produced:
         1. Topics (second column)
         2. The case without the identification numbers and the subjects
      iii. Dividing the case without the identification numbers and the subjects with the word "الدائرة حكمت" produced:
         1. The facts (third column)
         2. Court verdict (fourth column)

The process of translating and reformulating the identification numbers is shown in FIG. 30.

The topics column was divided into Topics, Summary, and Legal bond

Subsequently, the text of the topics was divided each time into two parts:

Dividing the text of the topics with the word "summary" produced:

Topics (first column) and Text topics without topics.

The text of the subjects without the subjects with the word "regulations and regulations" produced: Summary (second column) and Legal bond (third column)

Several cases remained missing legal bond part because they were not mentioned in the text of the case The following table has a list of the main categories of cases

| | |
|---|---|
| 1 | عقد |
| 2 | تعليم |
| 3 | تجاري |
| 4 | ⬜شركة |
| 5 | فكرية ملكية |
| 6 | ⬜التزوير |
| 7 | ⬜رشوة |
| 8 | تقاعد |
| 9 | تقاعد |
| 10 | وعسكرية مدنية خدمة |
| 11 | ⬜وظيفي⬜نفوذ استغلال |

This process started with text segmentation. To segment Arabic text, split long texts into sentences with complete meaning: noting that the texts are formal legal, and expressive.

FIG. 3B illustrates an example of text segmentation.

a. Select desired sentences were computed by comparing the sentences embedding vector and the long text embedding vector and expressing the result of this comparison with a number we define as the score.
b. Get a result as a list of items comprising a sentence from the text and its corresponding score.
c. Rank desired sentences by score.
d. Select Top-k sentences, for example, sentences with the highest similarity score to the whole text.
e. Fine-tune bidirectional transformer encoder.
f. Predict the text class and sub-class.

Extract conjunction words: Algorithm 2 describes an example of operations to extract conjunction words.

---
Algorithm 2 Extract Conjunction Words
---

1. We get real legal text data and made a training data out of it
   • It consist of more than 30K text
   • Range of number of words in each text is 2k words
2. Define general delimiters(appellate tool) which are used for general purposes like:

لاسيما ، لذلك ، لقد ، مع أن وتم ، ولذا ، ولكن ، ولكنهم ، وما دام ، ومعلوم ،

• From Arabic dictionaries and resources
   • Also we added the punctuation and numbered lists numbers to it, the result was about 300 delimiters
3. We used this delimiters to split each text in the data to meaningful sentences
4. Count number of words in all of the result sentences and take the longest 100 sentence
5. Read the sentences and extract new delimiters
6. The result delimiters are dedicated to legal texts like:

، مفادها، وكلا الأمرين ، وما يؤكد ،جاء فيها: ،التي استندت ،وحيازة ،وبسؤال، والمخول، وبالبحث،

7. split each text in the data to meaningful sentences with new and old delimiters
8. Repeat 4, 5, 6, 7 until the longest sentence contains less than 40 words Algorithm 1 Extract Conjunction Words
Model Architecture
  a. For example, a model may include an encoder stack, each of which may include an attention layer. A self-attention mechanism in the encoder stack may encode semantic relationships from the input sequence as attention scores and pass their normalized values to a series of forward-propagating layers. These representations are gradually refined with each new layer until the correct output sequence can be produced. A variable number of layers and self-attention heads may be used in the model. In contrast to word embedding, the model can process semantic information in both directions, thus treating the entire sequence as a single connected unit.

FIG. 1 illustrates an example of a model architecture of long and short Arabic document classification 500.

The stack of deep bidirectional transformer auto encoders layers are as follows:

The Transformer encoder 502 may include alternating layers of multi-head attention 5021 and MLP 5022 blocks. Layer norm 5023 is applied after every block and residual connections after every block.

The MLP 5022 may include two single-layer feed-forward network layers with a GELU non-linearity. The example may include a stack of 24 deep bidirectional transformer auto encoders number, and each encoder may include 16 attention head.

One block of the encoder can be mathematically represented as the following equations:

$$E_0=[e_{cls};e_{w1},e_{w2},e_{w3},\ldots,e_{sep}] \quad (1)$$

$$E_l'=LN(MSA(E_{l-1}))+E_l' \; l\in[1,L] \quad (2)$$

$$E_l=LN(MLP(E_l'))+E_l' \; l\in[1,L] \quad (3)$$

$$Y=LN(Z_L^0) \quad (4)$$

E: encoder
W: words
LN: Layer norms
MSA: Multi-head attention

A single-layer feed-forward network layer may apply a linear transformation as follows $$Y=x*A^T+b \quad (5)$$

The Loss Function is Calculated as Follows:

$$J = -(y\log(p) + (1-y)\log(1-p)) = -\sum_{c-1}^{M} y_{o,c}\log(P_{o,c}) \quad (6)$$

where, M is the number of classes, log is the natural log, y is a binary indicator (0 or 1) if class label c is the correct classification for observation o, and p is the predicted probability observation o is of class c.

Data and Knowledge Base Preparation

Morphologically rich languages, e.g., Arabic language, complicates training traditional word or sentence embedding algorithms as it needs to learn a new embedding for each morphology.

To prepare ALC Searchable Content, for example, using the ALC searchable content module 106, legal information may be extracted from an ALC Knowledge base data to enhance the searching process. Knowledge base data may already be classified based on case categories and subcategories. Each of the cases may be converted by a one-time process into a dense vector representation to generate document embeddings that may be indexed. The document embeddings dataset may be stored and used instead of text data in the search process. Query vectors may be compared to selected indexed documents' vectors at query time to find the top-k similar documents.

Connections may be determined between relevant documents by combining the extracted information and the indexed documents to create a list of Top-k relevant documents with a score of relevancies. In addition, the Top-k documents may be re-ranked to enhance their relevancy.

The generated tables of the re-ranked Top documents may be stored in the database schema.

To enhance a search result, extra information may be extracted from the classified data during the information extraction operations to find and explore non-trivial relationships between the data. For example, all the documents that contain legal cases that happened during a specific period, or all the legal cases controlled by the same law or sharia rulings may be combined. The relationships between data will be further explained below.

The data may be converted into dense vector representation before transforming the vectors into a more efficient format. This process may be a one-time process resulting in a file of embeddings stored in the database schema, so there may be no need to repeat the vectorization of the same dataset at every searching process.

At query time, the query vector may be compared to the documents' vectors to find, for example, the 10 most similar documents, and re-ranking the documents to get a more accurate result. By finding the relationships between ALC concepts and document embeddings, there will be: Semantic Relations between terms, Classified cases, Ontologies for each legal case, and Extracted Structured Data and Embedding for each legal case. All these combined to get an ALC Searchable Content.

FIG. 2 illustrates an example of various aspects of systems and methods for Board of Grievances (BoG) and Ministry of Justice (MoJ) tables.

Due to the lack of resources for Arabic Legal Cases (ALC) to train and create searchable content, create searchable content by collecting data from diverse and heterogeneous sources, preprocessing, and cleaning the data is challenging.

Figure 6:
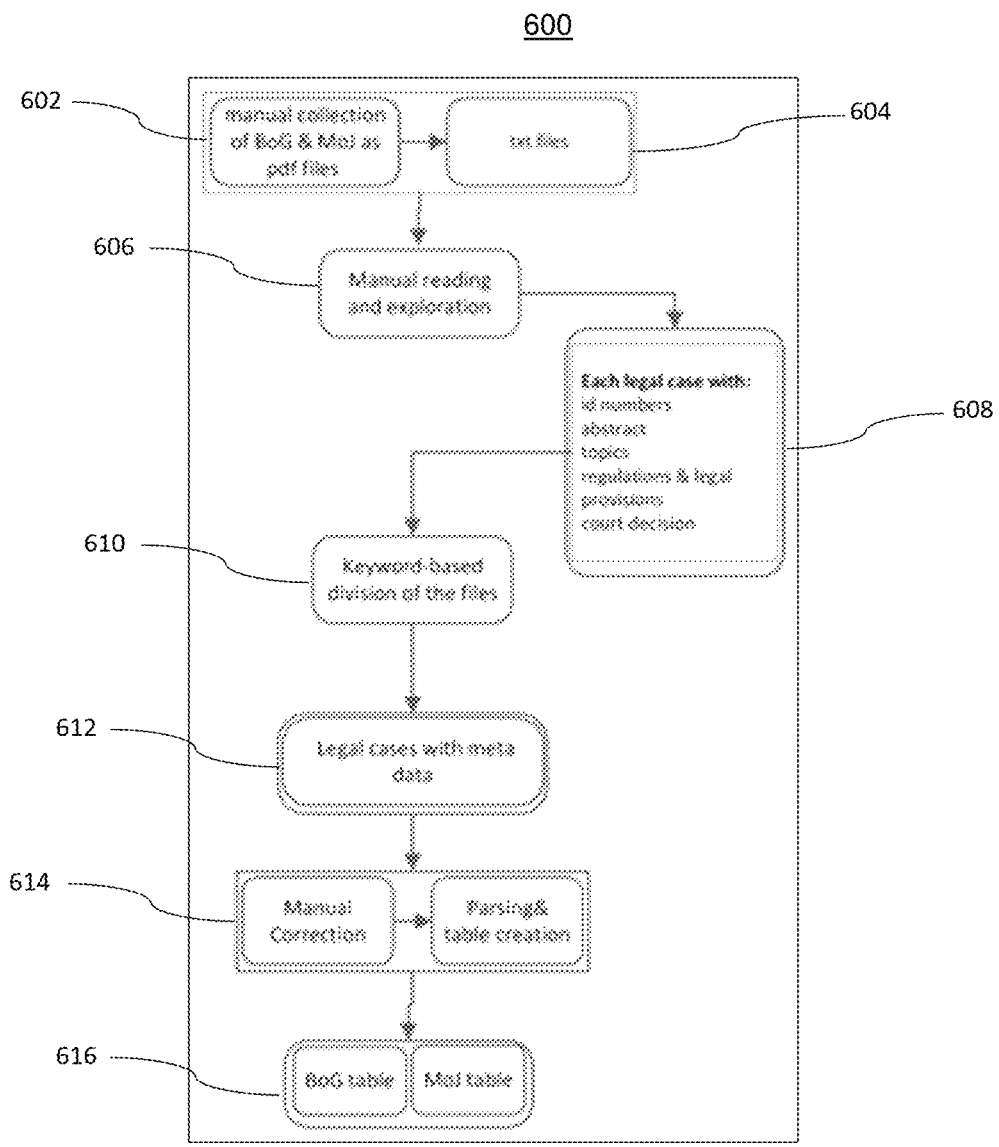
FIG. 6 illustrates an example for creating Board of Grievances (BoG) and Ministry of Justice (MoJ) tables.

As shown in FIG. 6, in process 602, ALC raw data is collected manually from the BoG and MoJ websites as pdf files, which may need to be automatically converted into text files in process 604 read, and explored to define a basic structure in process 606. In process 608, the data may be read and explored to separate each legal case and list its basic sections, including id_numbers, abstract, topics, regulations, legal provisions, and a court decision. For each legal case, specific keywords may be defined to get more information, e.g., meta data. The keyword and key phrase may include " الموضوعات والوقائع ", " حكمت الدائرة ", respectively.

In process 612, legal cases with its metadata are generated but may include inconsistent format and suffer from spelling errors, text wrapping, and missing letters, which may need to be corrected in process 614 using manual correction, for example, before being parsed and saved into MoJ and BoG tables. The MoJ and BoG tables may be stored in the database schema in process 616.

FIG. 3 illustrates an example of creating a Quran table.

Figure 7:
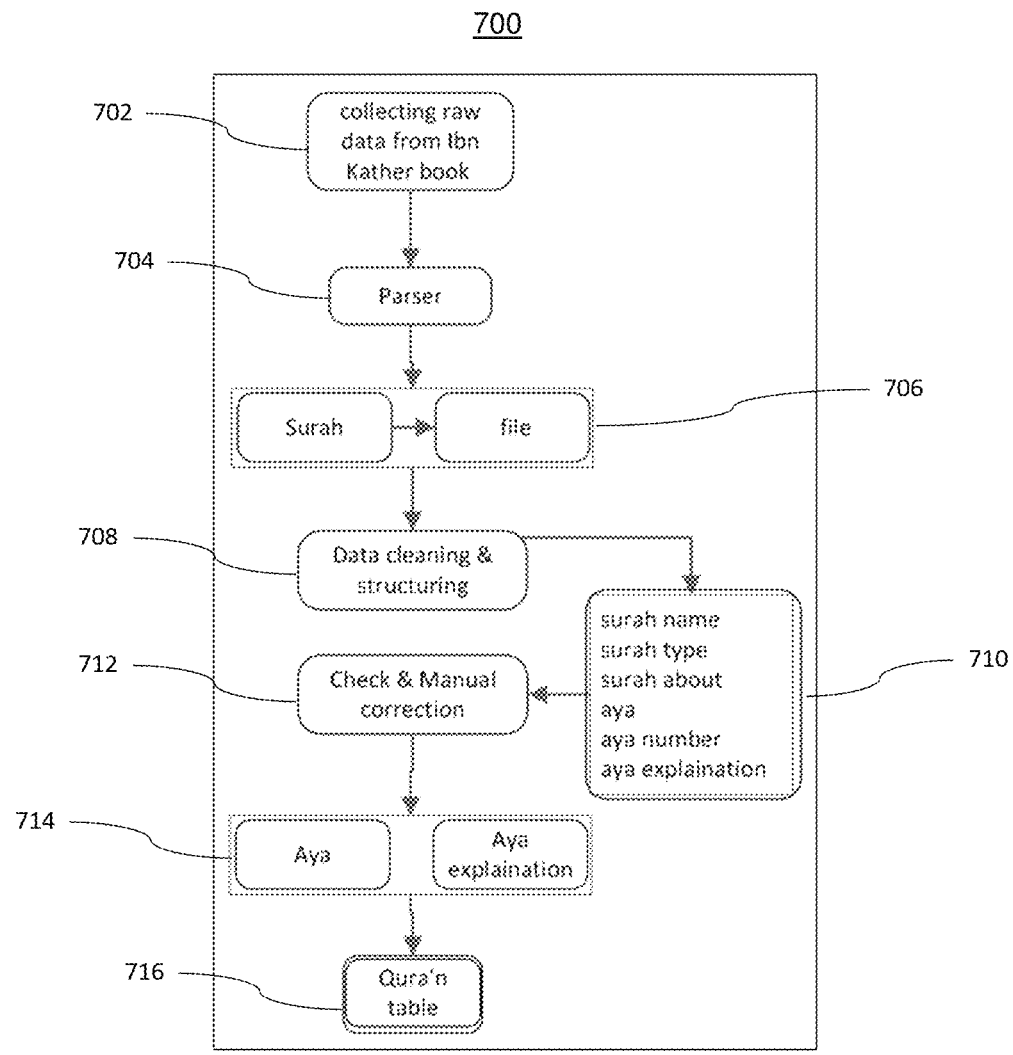
FIG. 7 illustrates an example of creating a Quran table.

As shown in FIG. 7, generating the Quran table 700 may start in process 702 by collecting the explanation data of the Holy Quran from Ibn Kathir's book on the comprehensive library website. The raw data and explanation may be collected in JavaScript Object Notation (JSON) format. In process 704, the collection pages are parsed using a predetermined text. In an example, the predetermined text may be the text " بسم الله الرحمن الرحيم ". The parsed text may be divided in surah and saved into files in process 706. The predetermined text may be the beginning of each surah.

In process 708, the surahs may be cleaned and structured into surah name, surah type, surah about, ayah, ayah number, and ayah explanation in process 710. In process 712, a check for accuracy may be performed, and corrections may be made to correct the mistakes. Finally, mistakes may be corrected manually or automatically to link each ayah with its explanation and store all the related data in the Quran table in process 716.

Figure 4:
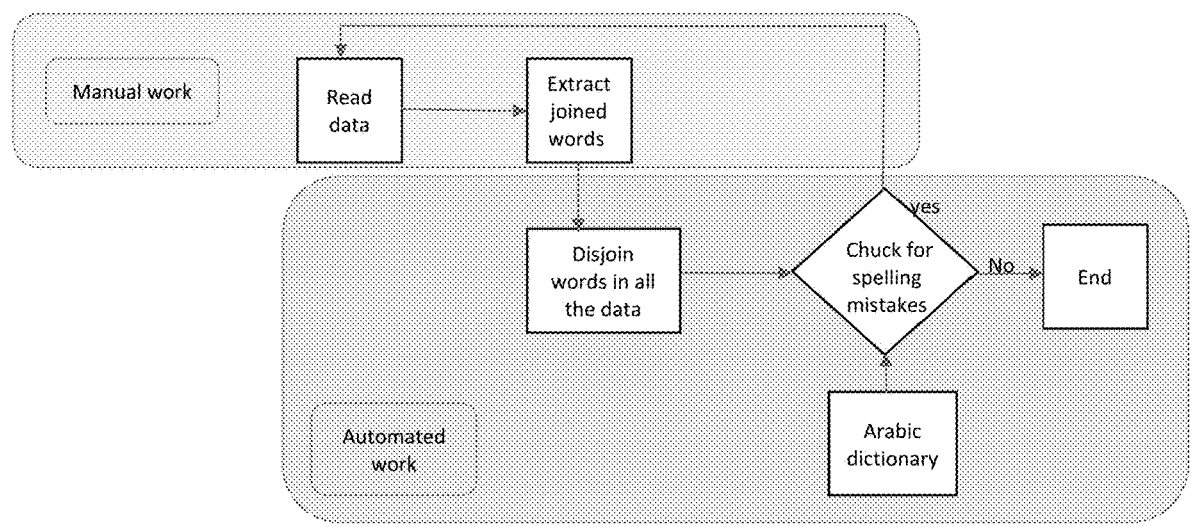
FIG. 4 illustrates an example of adjoining words.

FIG. 4 illustrates an example of creating a Hadith table.

Figure 8:
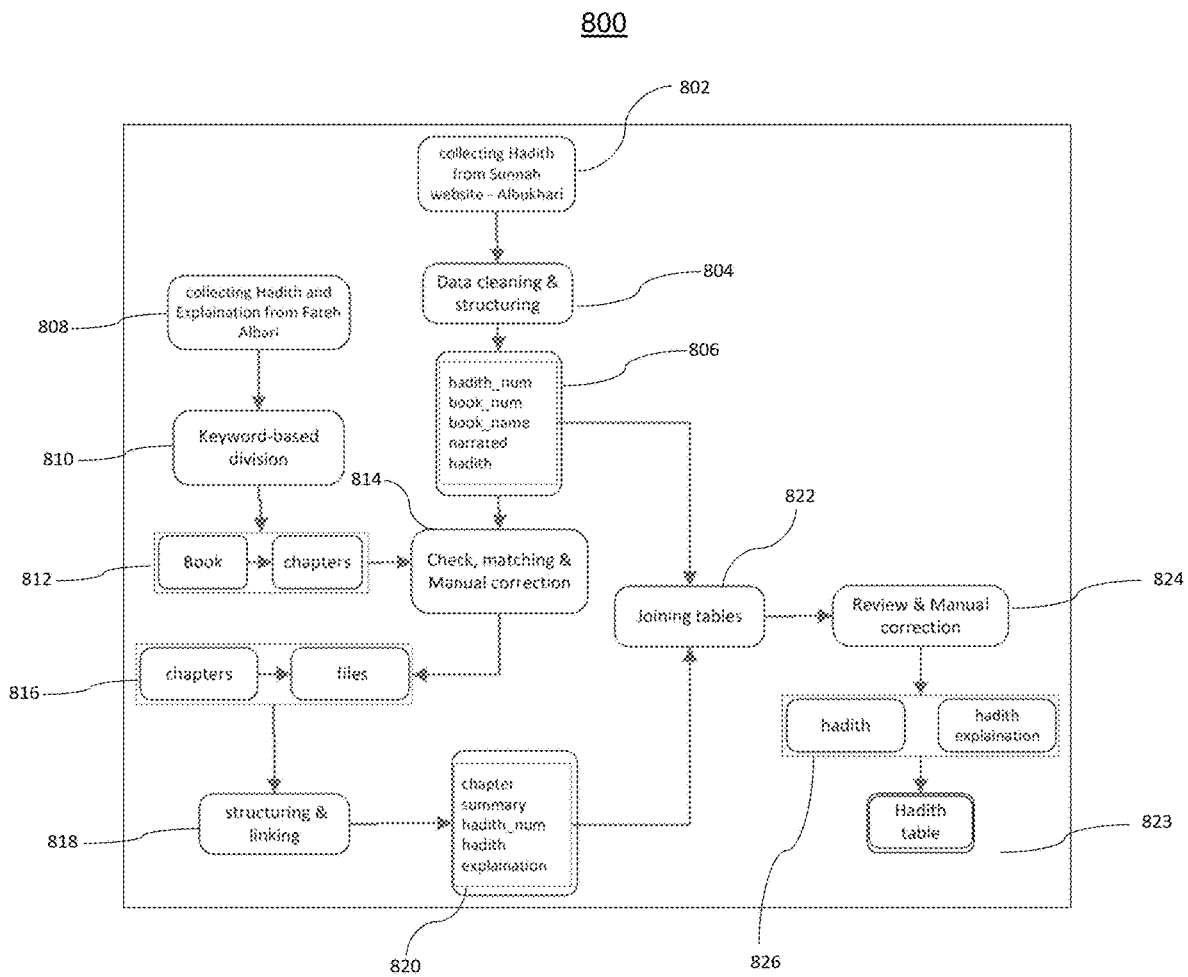
FIG. 8 illustrates an example of creating a Hadith table.
Figure 9:
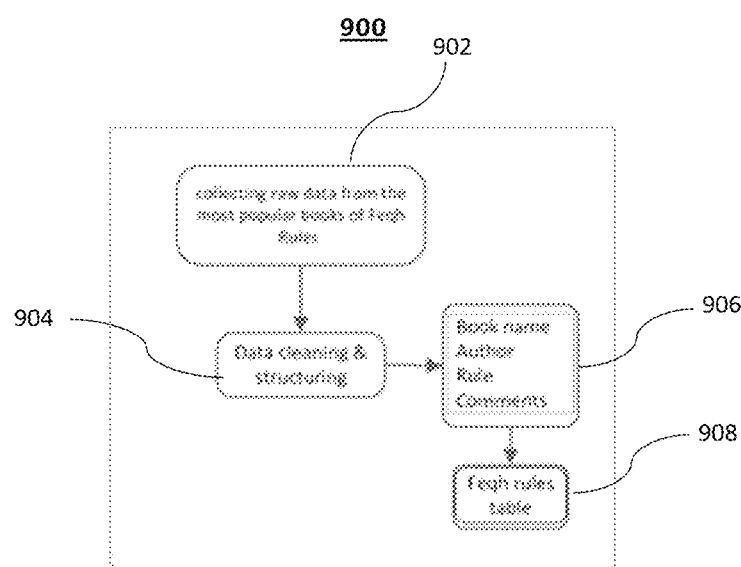
FIG. 9 illustrates an example for creating a Fiqh Rules table.

To create a Hadith knowledge base, there's a need to bind each Hadith with its explanation, as shown in FIG. 8. In process 802, raw data of Hadith from Al-Bukhari may be collected and stored. The raw data of Hadith may be collected from websites and stored in JSON format. In process 804, the data, e.g., the JSON files, may be cleaned and structured. The structuring may be based on Hadith number, book number, book name, narrator, and Hadith text. In process 808, raw data of Hadith from an explanation from Fateh may be collected and stored. The raw data of Hadith may be collected from websites and stored in JSON format. In process 810, each book of the collected Hadith is divided into chapters and files. The hadith explanation from Fateh Albari may be divided based on the " باب قي " keyword, for example.

The whole list of Hadith, for instance, from Bukhari and their explanation from Fateh Albari may be linked and checked for errors. The Errors may be corrected manually or automatically. In process 822, the two resulting tables may be joined and corrected for errors in process 824.

Table 2 in FIG. 31 lists Hadith Books and Hadith Explanation Books

Figure 5:
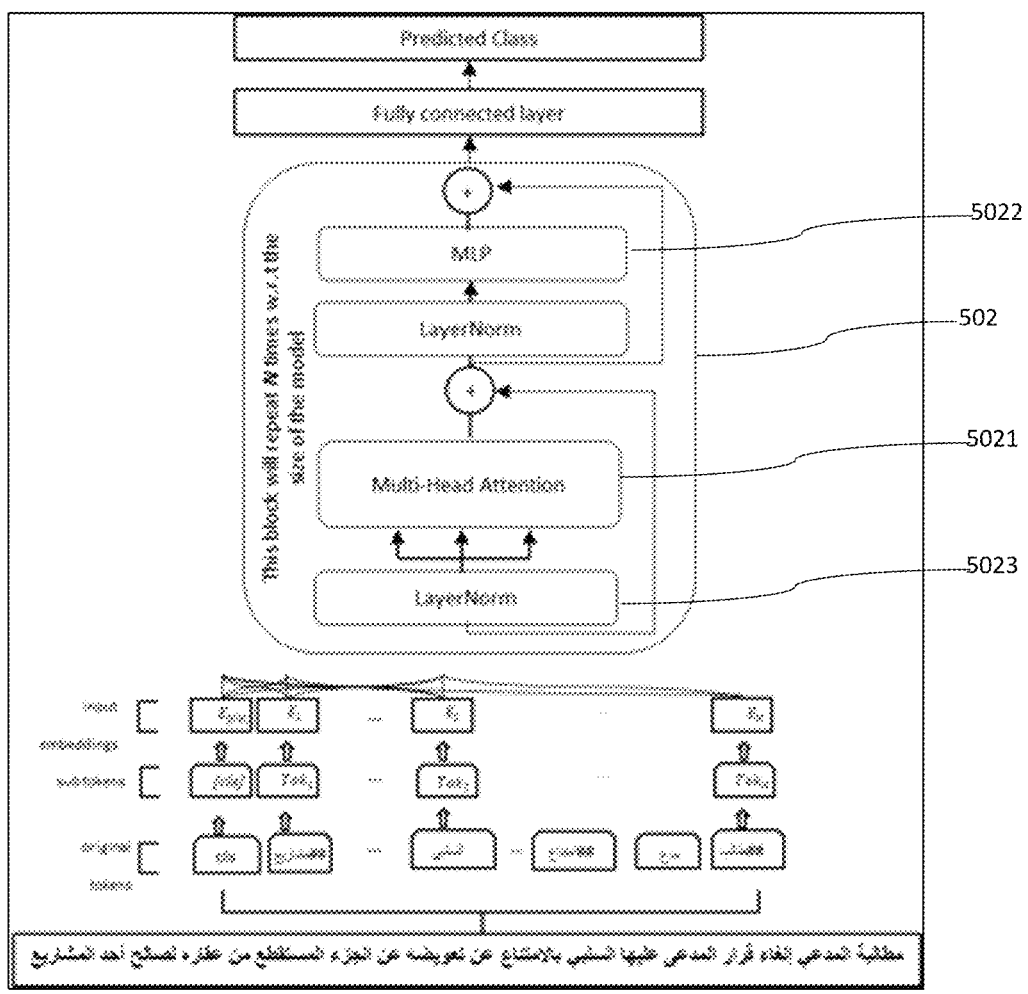
FIG. 5 illustrates an example of a model architecture of long and short Arabic document classification.

FIG. 5 illustrates an example for creating a Fiqh Rules table.

In process 902, raw data from different fiqh denominations may be selected and stored in a database. For example, the different fiqh denominations may be the four most popular books selected and gathered from a comprehensive library. Then, the raw data is cleaned and structured in process 904 into book name, author, rule, and comments in process 906 to be saved in the Fiqh rules table 908.

Figure 10:
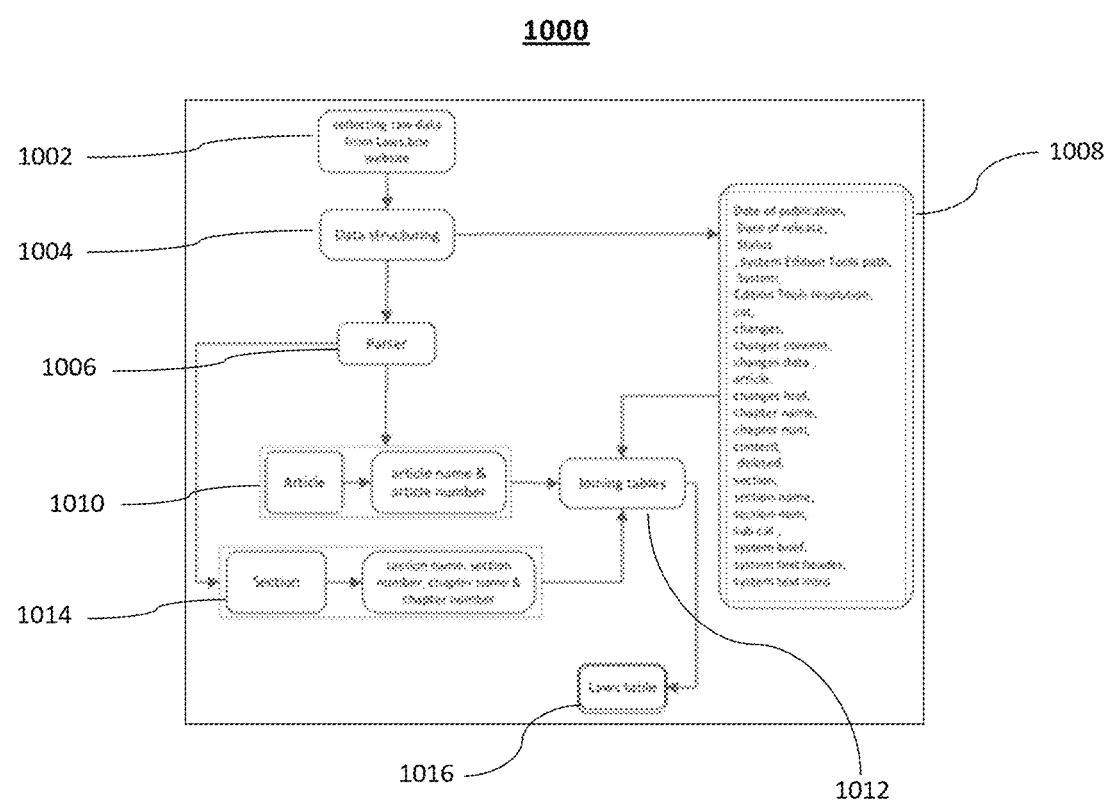
FIG. 10 illustrates an example for creating a Laws table.

FIG. 10 illustrates an example for creating a Laws table.

In process 1002, raw data of laws may be collected from different sources and stored in a database. In an example, the raw data is collected from online resources and stored in a JSON format. In process 1004, the raw data may be structured to create, in process 1008, the columns date of publication, date of release, status, System Edition Tools path, System, Edition Tools resolution, cat, changes, changes content, changes data, article, changes href, chapter name, chapter num, content, deleted, section, section name, section num, sub cat, system brief, system text header, system text intro, etc. In process 1006, information may be extracted from the structured data using a parser, and in process 1010, the article field is split into article name and article number fields. In process 1014, the parser may extract the section name, section number, chapter name, and chapter number fields from the section field. In process 1012, all the new columns may be merged with the previous structure to be saved into the table of the law in process 1016.

FIG. 6 illustrates an example for connecting tables of the BoG and MOJ, Quran, Hadith, Fiqh Rules, and Laws.

Figure 11:
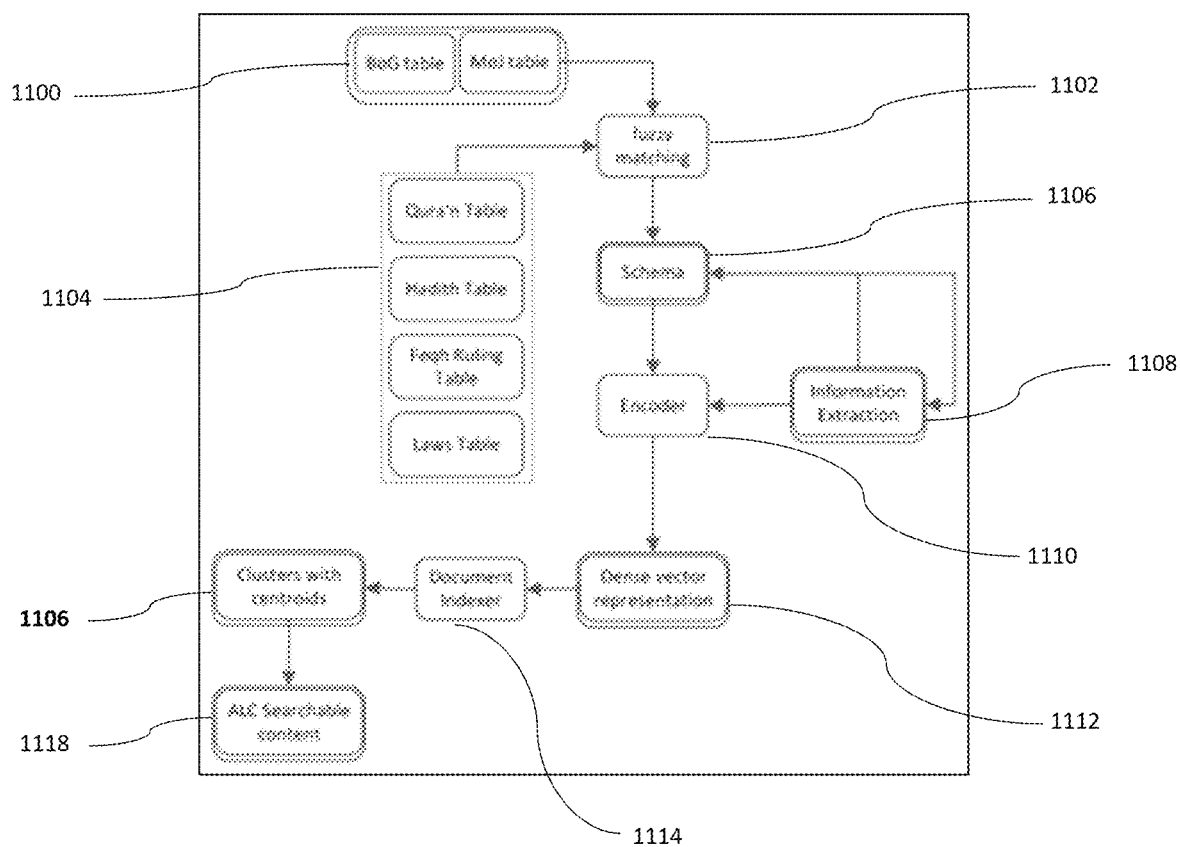
FIG. 11 illustrates an example for connecting tables of the BoG and MOJ, Quran, Hadith, Fiqh Rules, and Laws.

As illustrated in FIG. 11, to create searchable content based on ALC, it may be desired to bind the Quran, Hadith, Fiqh Rules, and Laws tables 1104 with the BoG and MoJ tables 1100 using a Fuzzy matching method 1102. In process 1106, a database schema is defined for the output of the fuzzy matching method 1102. Each row in the BoG and MOJ is considered a document, and the documents are classified into categories and subcategories. In process 1110, an encoder converts the categories and subcategories into a dense vector representation. In process 1108, information, such as keywords and named entities, is extracted from the documents to improve the searching process, and the information may be stored using the database schema. In process 1112, the dense vectors may be stored as indexed files to be connected to the database schema. The documents may be indexed in process 1114 using a document indexer. In process 1116, the indexed documents may be clustered with centroids, and information may be extracted from the clustered documents to generate an ALC searchable content in process 1118.

Figure 12:
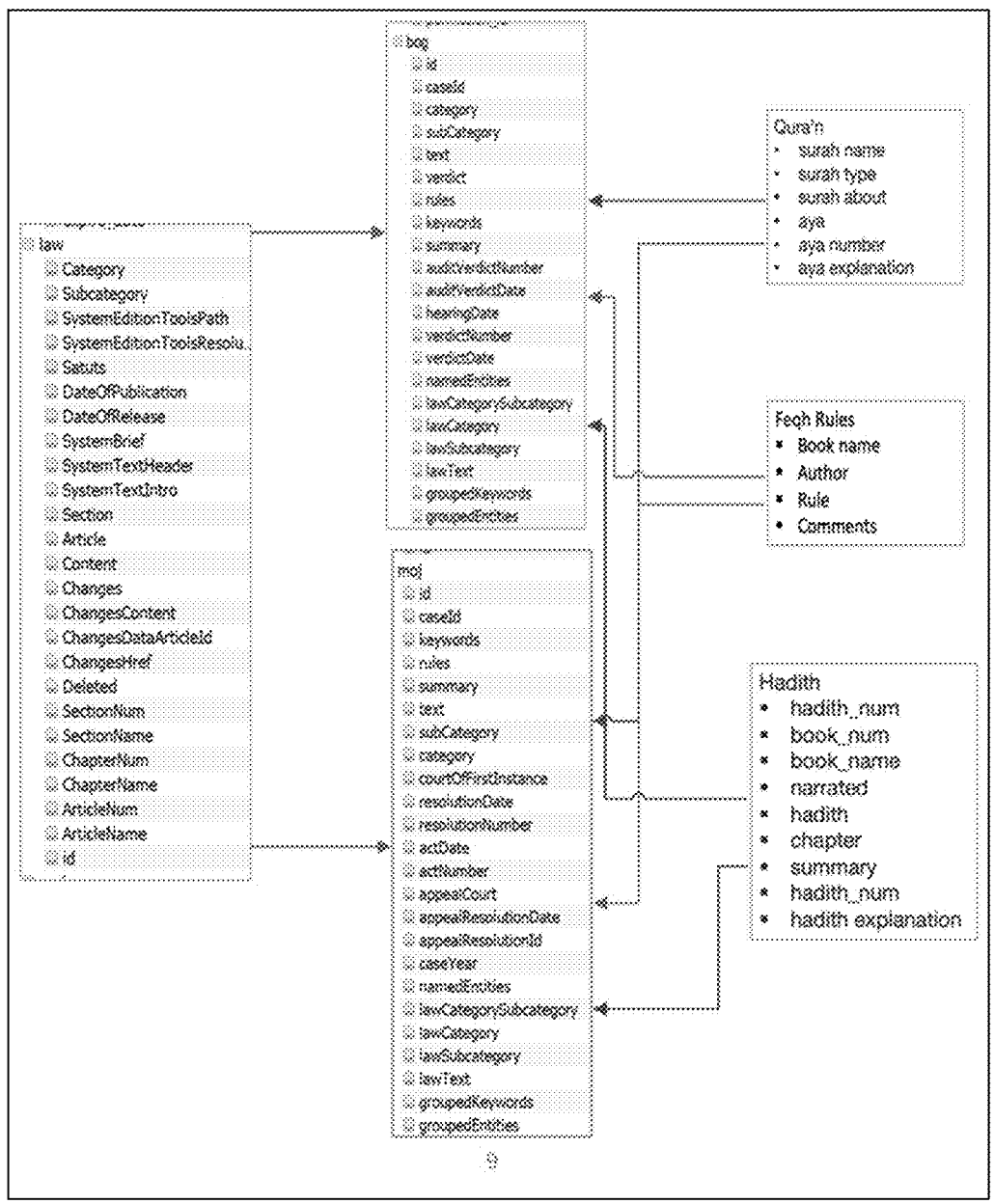
FIG. 12 is another diagram illustrating an example of various aspects of connecting tables of the BoG and MOJ, Quran, Hadith, Fiqh Rules, and Laws.

A schematic block diagram illustrating various aspects of systems and methods-Connecting all the tables FIG. 12 is another diagram illustrating an example of various aspects of connecting tables of the BoG and MOJ, Quran, Hadith, Fiqh Rules, and Laws.

In FIG. 12, the Quran, Hadith, Fiqh rules, and laws tables are linked to the Board of Grievances (BoG) and the Ministry of Justice (MoJ) using Fuzzy matching. In an example, the data of the BoG may be based on the law, and the data of the MoJ table may be based on the law, Hadith, Holy Quran, and Fiqh rules.

After a previous correction process for the legal cases of the Board of Grievances (BOG), a section was concluded in which the evidence on which the judgment was based in the case was presented and collected in a column and named it "Rules." In the Ministry of Justice (MoJ) data, a column indicates the evidence, which is the "legal bond." The rules were also linked to the cases in a fuzzy matching method as in the laws, but here the rules were divided into sentences before comparing them with the cases because it is possible to rely on part of the rule and not the entirety.

Schema of Arabic Legal Cases (ALC) Knowledge base

Figure 13:
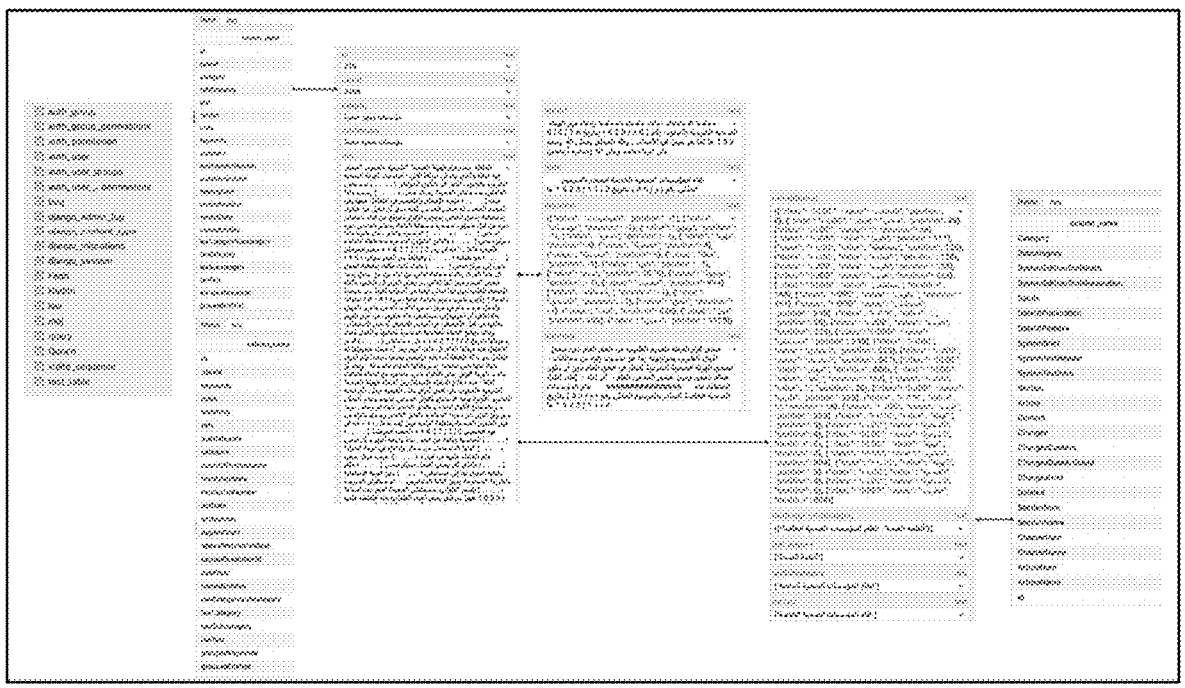
FIG. 13 illustrates an example of a database schema for an Arabic Legal Cases (ALC) Knowledge base.

FIG. 13 illustrates an example of a database schema for an Arabic Legal Cases (ALC) Knowledge base.

The tables used by the systems and methods for semantic search and information extraction process may include BoG, MOJ, Fiqh, Quran, Hadith, Law, and the query tables.

BOG and MoJ tables comprise id, caseid, category, subcategory, text, verdict, rules, summary, auditVerdictNumber, auditVerdictDate, hearingDate, verdictNumber, verdictDate data, which may be extracted at the primary preprocessing stage. On the other hand, keywords, named entities, lawCategorySubcategory, lawCategory, lawSubcategory, law-Text, groupedKeywords, and groupedEntities may be extracted from text column during the analyzing and information extraction process.

Column Description:

Caseid is the id number of each case after extracting them from pdf files. Then, each of these cases is categorized into categories and subcategories. For example, there are several categories and subcategories, illustrated in Table 4.

The table in FIG. 32 shows Examples of categories and subcategories

The text column may include detailed information about a legal case, and the summary column may include a summary of the legal case. In addition, keywords may be extracted from the text column and stored as a value and position pair in the keyword's column and as a comma-separated text in a groupedKeywords column. In addition, there may be five types of named entities: Location (LOC), Job (JOB), Person (PER), Organization (ORG), and Object (O), which are extracted from text column and stored as value and position pair in namedEntities column, and as a comma separated text in a groupedEntities column.

Law CategorySubcategory and text may also be extracted from the text column, stored in the BoG and MoJ table, and referenced in the separated table of Law, which contains all the details of each Law to be a clear source of the laws. Similarly, the Qur'an, Hadith, and Fiqh may be extracted from text columns and referenced in separate tables.

Relationships Between Knowledge Base Data

Figure 14:
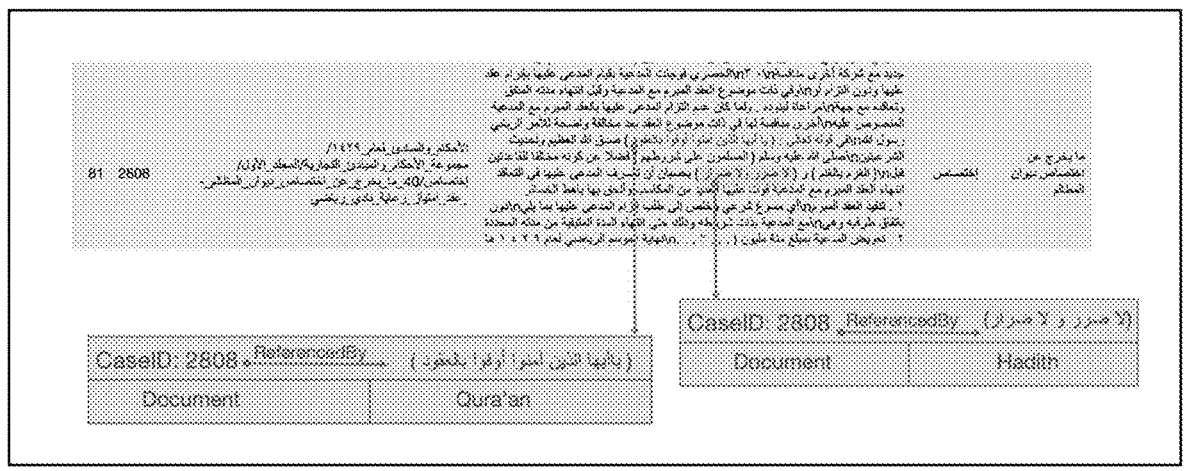
FIG. 14 illustrates an example of a first-level relationship-refrencedby.

FIG. 14 illustrates an example of a first-level relationship—refrencedby.

The unstructured data of the knowledge base may be related to enhancing a search technique to be more efficient in yielding accurate results, with a low opportunity to have irrelevant search results.

There may be three levels of relations to bind the data. The first level of relationship may occur between documents and has two types, refrencedBy and controlledBy. The refrencedBy and controlledBy types may connect documents where a judgment or accusation in a legal case to be referenced by a text to the Qura'an, Hadith, or Fiqh, and Law data and controlledBy Rules, frameworks, and legislations database tables. FIG. 14 illustrates RefrencedBy relationship where a part of the legal document with id:2808 is refrencedBy a text of Hadith: (لا ضرر ولا ضرار) in Hadith table and text of Quran: (يأيها الذين آمنوا أوفوا بالعقود) in Quran table.

Figure 15:
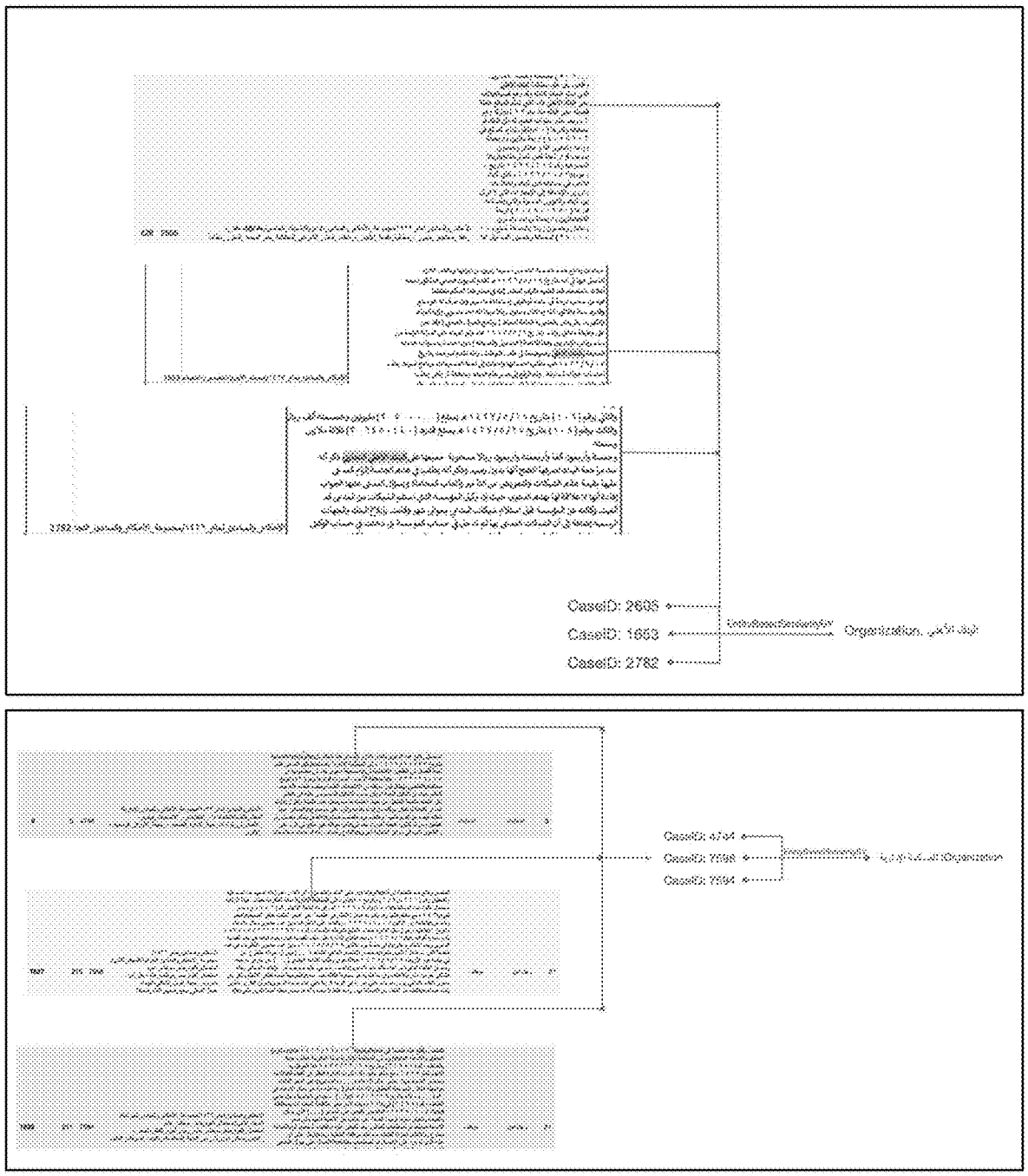
FIG. 15 illustrates an example of a second-level relationship-similaritybased.

FIG. 15 illustrates an example of a second-level relationship—similaritybased.

The second level of the relationship may focus on the content inside the documents where clustering of the documents is based on similarity, EntityBasedSimilarity, and TopicBasedSimilarity. For example, as illustrated in FIG. 15, three documents (Case ID: 4744, 7598, and 7594) clustered based on their Entity Similarity are all legal cases having the Organization: المحكمة الإدارية Thus, making it easier to know if the legal cases are handled by المحكمة الإدارية..

Figure 16:
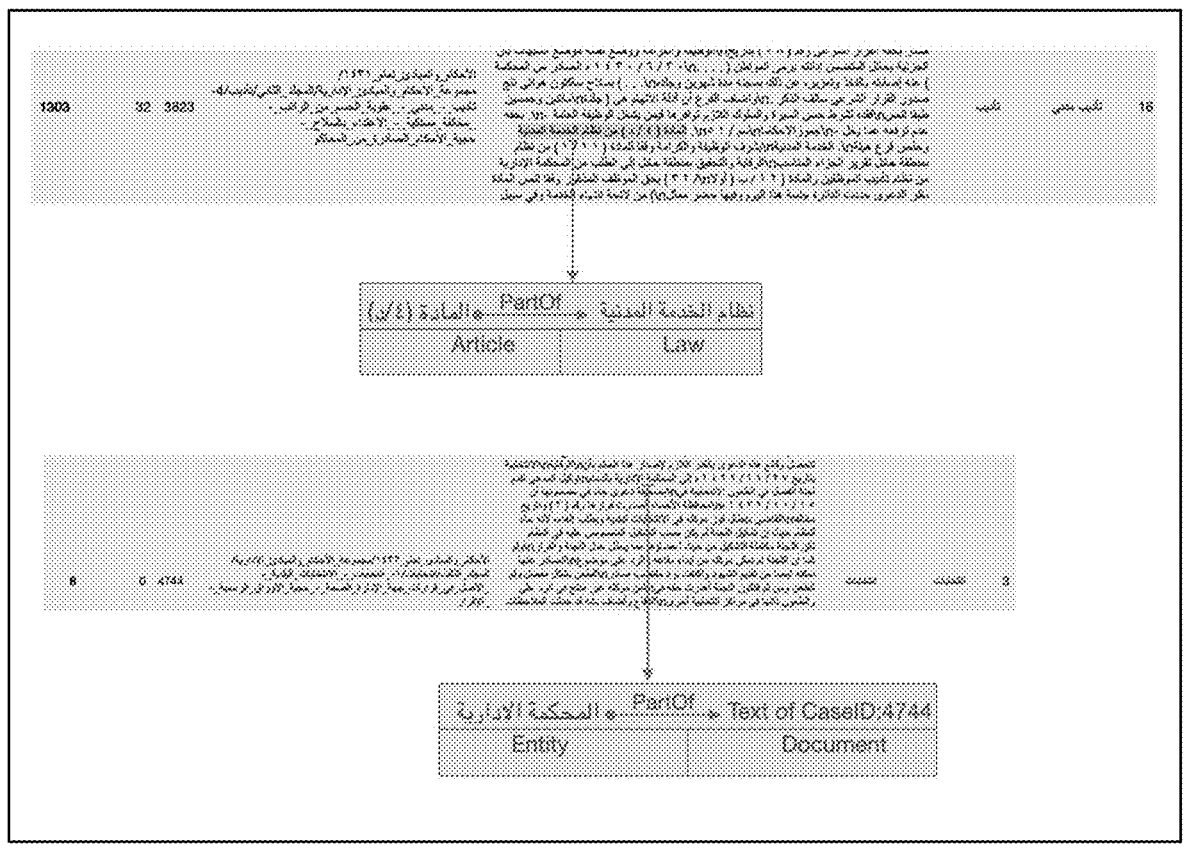
FIG. 16 illustrates an example of a third-level relationship-PartOf.

FIG. 16 illustrates an example of a third-level relationship-PartOf.

The text inside the document may include many entities and information that the third level of the relationship can connect. FIG. 16 illustrates an example of the PartOf relationship, which may connect two portions of information in the text, such as connecting an Entity as apart from a Document or an article as a part of Law. By creating a relationship between the article (مادة (٤/-)) as part of the Law (نظام الخدمة المدنية), all the articles that are considered parts of a particular Law may be included.

Information Extraction

In an example, an input sentence $x$ may be tokenized before being used in a model. The sentence $x$ may be padded to reach the maximum sequence length. Tokenized $x$ with the corresponding attention mask may be passed to the model, which may output contextual embeddings of $x$. Transformer models may use numerous separate attention mechanisms in each layer. In the case of some popular base models, a total of 12×12 attention heads may be used. In practice, each token may be connected with 12 distinct features of any other token in the sequence.

In an example, two output aspects that may be desired for accurate classification are prediction scores and hidden states. The prediction scores may be obtained as the output of the last layer of the model and thus represent the result of all attention heads in all layers and are relative to parameters, such as batch size, hidden states size, and sequence length. Meanwhile, hidden states may be the output of the individual layers of the model, and their total number may be equal to the number of layers+1 (12+1). The output of one layer may immediately be used as an input for the next layer, which may contextualize its content further using its own attention heads. Thus, the prediction score may represent a hidden state created by the final layer in the model.

An output of the model may be understood in different ways. Intuitively, it seems logical that the last layer should contain all the information gained through various stages of learning, so its output should be seen as relevant regardless of how the input vectors changed as they passed through the layers. On the other hand, it is quite possible that some of the vector modifications accidentally eliminated bits of useful information that could have contributed to an accurate prediction. To compensate for it, the input vectors can be partially or completely concatenated, or their sum could be used, which may significantly improve accuracy. The model may also include a linear layer that helps reshape the model's output into three dimensions (batch size, number of tags, sequence length) and then passed to a CRF layer tasked with predicting the probabilities for each tag.

The extracted information can be Named Entities or Keywords.

Named Entity Recognition

Algorithm 3 Described the Main Algorithm of NER

---
Algorithm 3 NER Main Algorithm
---

Input : path to saved pretrained auto encoders path ,
    auto encoders output pooling type pool_type ,
    Dimensionality of the encoder layers hidden_size,
    Number of encoders in the pretrained model
    num_encoders_layers
    Number of NER tags num_tag
    input_ids,
    attention_mask
    labels
Output: prediction , loss
1 auto_encoders ← load_pretrained_auto_encoders(path)
    drop ← Dropout_layer( )
2 if pool _type == 'concat' then
3 | linear ← Linear_layer( num _encoders _layers * hidden _size,
  | num_tag)
4 else pool _type == 'sum' or pool _type =='last'
5 | linear ← Linear _layer( hidden _size, num _tag)
 | else
 | throw Sorry, allowed types are :
   | 1. sum (to sum the num _encoders _layers)
   | 2. last (to get only last hidden _layer)

---
Algorithm 3 NER Main Algorithm
---

| 3. concat (to concat num _encoders _layers)
 |
6 end
7 if numb_encoders_layers > auto_encoders.num_encoder_layers then
8 | throw Sorry, model has auto_encoders.num_encoders_layers
   | hidden state only change num_encoders_layers parameter
9 end
10 cr f ← CRF(num_tag)
output ← auto_encoders(input _side, attention_mask)
11 if pool_type == 'concat' then
12 | last_layers ← output.encoders_layers[-num_encoders_layers :]
   | last_layers ← concatenate(last_ayers)
13 else pool_type == 'sum'
14 | last_layers ← output.encoders_layers[-num_encoders_layers :]
 | last_layers ← sum(last_layers)
15 | elseif (pool_type =='last')
 | last_layers ← output.lastencoder_layer
 | else
 | throw Sorry, allowed types are:
   | 1. sum (to sum the num_encoders_layers)
   | 2. last (to get only last_layer)
   | 3. concat (to concat sum_encoders_layers)
16 end
17 d_tags ← drop(last_layers)
   emissions ← out_tag(d_tags)
   prediction ← cr f(emission)
   loss ← -cr f( log_softmax(emission, 2), label)
18 return (prediction , loss)

Algorithm 2 NER Min Algorithm

In the models, there may be a decoder stack and an encoder stack, each of which may include an attention layer. A self-attention mechanism in the decoder stack may encode semantic relationships from the input sequence as attention scores and pass their normalized values to a series of forward-propagating layers. Conversely, in the encoder stack, the representations may gradually be refined with each new layer until the correct output sequence can be produced. The number of layers and self-attention heads in the model may vary, and the model may process semantic information in both directions, thus treating the entire sequence as a single connected unit.

FIG. 16 is an example of a named entity recognition model architecture.

Figure 17A:
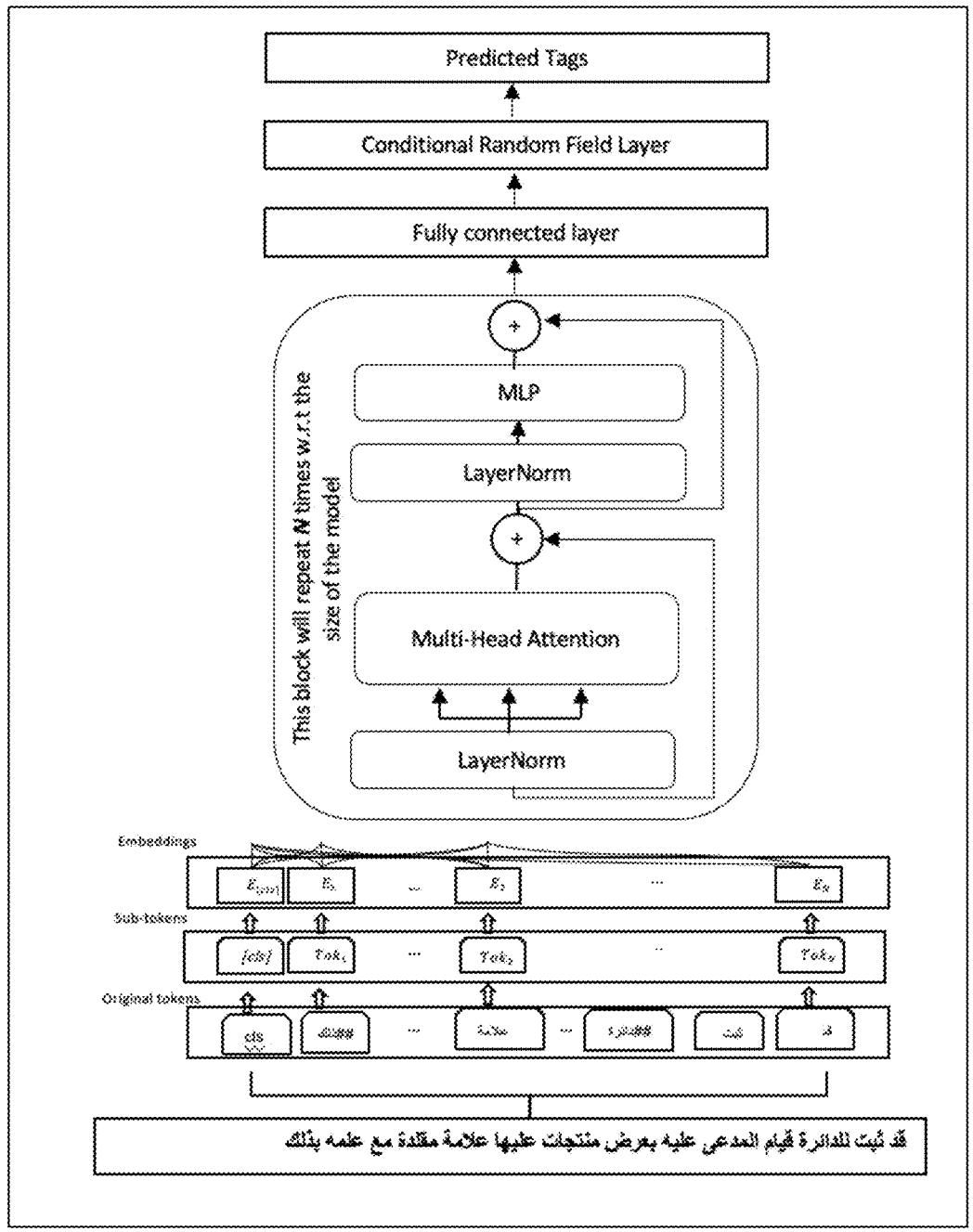
FIG. 17A illustrates an example of a model architecture for Named Entity Recognition.
Figure 17B:
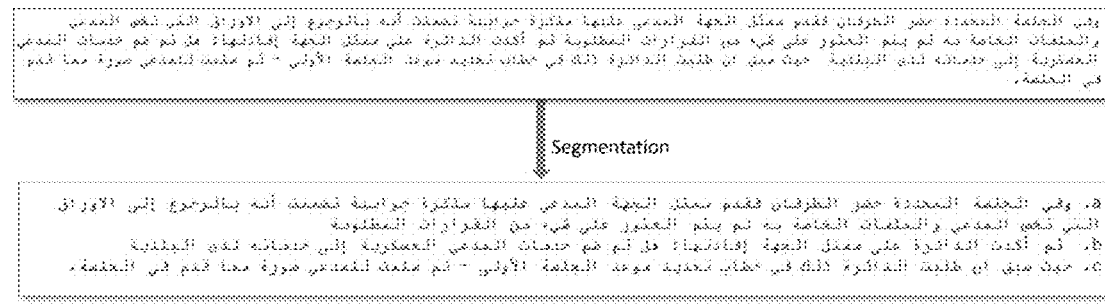
FIG. 17B illustrates an example of text segmentation by conjunction words recognition.

FIG. 17 depicts an example model architecture comprising three layers. In the first layer, three pre-trained models are fine-tuned for the Arabic Named Entity Recognition task. The second layer is a fully connected linear layer that receives the output of the pre-trained model and reshapes it to be an input for the third layer. The final layer is the conditional random field (CRF), the tagging algorithm. The CRF may ensure that the objective of the model training is to return the most accurate combination of outgoing tags. In addition, a dropout procedure may be applied to keep the training procedure well-balanced between entity classes. In the example model, there are 18 NE classes as listed in a table with examples (see FIG. 33).

Preparation of Legal Cases NER Dataset

Data use case is a token classification of text tokens into the following tags:
  a. W tagged are words tags
  b. S tagged are sentences tags
Manual tags:
  a. Person -w
  b. Organization -w
  c. Location -w d. Job -w
e. Legal bond Hadith -s
f. Legal bond Fiqh -s
g. Legal bond law -s
h. Document -w
i. Citation -w
J. Evidence -s
k. Accusation -s
l. Verdict -s
m. The number of rows is: 311328

Labels Statistics:

| English Tag | Arabic Tag | Tag count |
|---|---|---|
| accusation | التهمة | 19974 |
| document | مستند | 91058 |
| evidence | دليل | 67456 |
| Hadith | حديث نبوي | 10094 |
| Qura'n | قرآن كريم | 8019 |
| job | وظيفة | 46415 |
| jurisprudence | فقه | 15648 |
| law | قانون | 41694 |
| location | موقع | 9127 |
| organization | منظمة/مؤسسة | 73171 |
| person | شخص | 15685 |
| Nationality | جنسية | 26651 |
| Currency | عملة | 13456 |
| Amount | مبلغ | 17982 |
| Date time | وقت وتاريخ | 36548 |
| citation | اقتباس | 36133 |
| verdict | حكم | 38189 |

The following operations may be used to generate the data illustrated above.

Text Segmentation

Split text into meaningful sentences by conjunction words of the Arabic language.

Suppose we have the following list of appellate sentences: { {ان سبق حيث ، ثم} } in the following example:

Extract Nested Tags

Nested tags are one token that is possible to have multiple tags:

Example

قاضي؟محكمة؟عامة؟في؟رياض؟
All of the tokens in this sentence are labeled as a job
Also, محكمة؟عامة؟في؟رياض؟ is an organization
رياض؟ a location Data preview

| Column name | Description | type | values |
|---|---|---|---|
| Case id | case id | str | Name of data + id ex "moj_234" |
| Sentence id | the id of the sentence in its case | int | |
| word | word in the sentence | str | |
| Tag | General tag of the word | str | One of the previously mentioned classes in slide 24 |
| Word tag | Tags that classified as word tags | | W tagged are words tags mentioned classes in slid 24 |
| Word_tag_nested(x) | X is any word tag | str | W tagged are words tags mentioned classes in slid 24 |

Keywords Extraction

Extract a few words that express the main idea behind a text. Keywords extraction task can be formalized as either a token classification problem or a ranking problem.

The stage of extracting keywords by arranging the text words with embeddings, as described in Algorithm 4: cut all parts of the text sentences into length X between 1 and 4 words; consider the resulting parts of all candidates to be keywords as described in Algorithm 4.1 Create Candidates; embed the parts and compare their proximity to the embedding of the original text; the closest parts are the most desired, and the farthest parts are least desired; and the resulting number of parts is the same as the number of candidate parts but rearranged and the nearest N is described in Algorithm 4.2 Ranking Model, and N is related to the length of the original text and is proportional to it.

The stage of grouping similar keywords into groups:

1. We often produce keywords that share syllables, for example, (wallet), and (red wallet), as described in Algorithm 4.3 Clustering Keywords
2. We group these words into groups and choose the ones with the highest length because they contain more information The stage of calculating filters for the resulting keywords 1. Noting that the keywords have a specific pattern of the part of speech. Therefore, we will reject any results that do not belong to these predetermined patterns mentioned below
2. We calculate the following filters to, tnorm, trel in addition to the length of the keyword, considering the root of the word in the calculation as well
3. filter results

```
Algorithm 4 Keywords Extraction

Input      : text, ranking_model, accepted_patterns
Output[ ]  : keywords_features.listofkeyword
Parameters: accepted.pattern
20 words_list ← text.split( )
   sentences ← segment(text)
   stemmed ← sentences ← stem(sentences) # Algorithm 4.1
   stemmedwords_list ← stem(words_list)
   top_n ← round(length(words_list) ÷ 3)
   ranked_keywords ← ranking_model.extract(text, top_n) # Algorithm 4.2:
   similar .keywords.clusters ← clusters_keywords(ranked.keywords)#Algorithm 4.3:
   stem_similar_keywords_clusters ← stem(similar_keywords_clusters)
   keywords_features_clusters ← [ ]
21 for i ← 0.1.2,..., Lsimilar_keywords_clusters do
22 |  kw ← simalar_keywords_clusters[I]]
   |  skw ← stem_similar_keywords_clusters[I]
   |  pos_lst ← pos(kw)
```

Algorithm 4 Keywords Extraction

```
   | l_pos_lst ← Tpos_kw(stemmed_sentences, skw)
   | t_norm_lst ← Tnorm(stemmed ← words ← list, skw)
   | t_rel_lst ← Trel(stemmed_words_list, skw)
   | o_t_pos_lst ← Tpos_kw(sentences, kw)
   | o_t_norm_lst ← Tnorm(words_list, kw)
   | o_t_rel_lst ← Trel(words_list, skw)
   | occurrences.lst ← get_occurrences(skw, stemmed ← words ← list) +
   | get ← occurrences(kw, words ← list)
   | for item ← 0,1,2,... l_pos_lst do
23 |  | foreach pattern ∈ [accepted_patterns] : do
24 |  |  | if pos == pattern then
25 |  |  |  | tmp ← [ ]
   |  |  |  | tmp.add(kw)
   |  |  |  | tmp.add(occurrences.lst[item])
   |  |  |  | tmp.add(i_pos_lst[item] + o_t_pos_lst[item])
   |  |  |  | tmp.add(t_norm_lst[item] + o_t_norm_lst[item])
   |  |  |  | tmp.add(t_rel_lst[item] + o_t_rel_lst[item])
   |  |  |  | tmp.add(len(kw))
   |  |  |  | keywords_features_add(tmp)
   |  |  |  | break
   |  |  |
26 |  |  | end
27 |  | end
28 | end
29 end
30 keywords_features ← [ ]
   foreach kwc ∈ [keywords_features_clusters] : do
31 | max_kw_len ← 0
   | targeted_kw ← None
32 | foreach i ∈ [kwc] : do
33 |  | if i[5]>max_kw_len then
34 |  |  | #5indexofthekeywordslength
   |  |  | max_kw_len ← i[5]
   |  |  | targeted_kw ← i
35 |  | end
36 | end
37 | keywords_features_add(targeted_kw)
   |
38 end
39 return keywords_features
```

Algorithm 3 Keywords Extraction Algorithm

Algorithm 4.1 Create Candidates

```
Input x: document , n : number of words string
Output: chunk
1 chunk ← [ ]
2 for idx ← 0, 1,2,...Lx, step n do
3  | chunk.add(x[idx : idx + n])
4 end
5 return chunks
```

Algorithm 4.2 Ranking Model

```
Input    : text , top_n
Output   : [ ] , list of sentences of ranked keywords
parameters: embedding_model , bidirectional encoders transformers
model
6 candidates ← creatCandidates(text)
  encoded_candidates ← embedding_model(candidates)
  encoded_text ← embedding_model(text)
  sotred_candidates ← similarity(encoded_text, encoded_candidates)
7 return Sotred_candidates[:top_n]
```

Algorithm 4.3 Clusters Keywords

```
Input : keywords_list , T ,
Output: [ ] clustured_keywords , list of list of strings
8 kw_lst ← keywords_list
  clustured_keywords ← [ ]
9 foreach ki IN kw_lst: do
10 | flag ← false
   | tmp ← [ ]
   | foreach kj IN kw_lst[1:]: do
11 |  | count ← 0 # add keywords who contain common words to one cluster
   |  |  foreach j IN kj.split( ): do
12 |  |  | if j IN ki then
13 |  |  |  | count ← count + 1
```

| Algorithm 4.3 Clusters Keywords |
|---|
| 14 \| \| \| \| end |
| 15 \| \| \| end |
| 16 \| \| \| if count > T then |
| 17 \| \| \| \| tmp.add(kj) |
| \| \| \| flag ← True |
| \| \| \| kw_lst.delete(kj) |
| \| \| \| |
| 18 \| \| end |
| 19 \| end |
| 20 \| if flag == False: then |
| 21 \| \| tmp.append(ki) |
| 22 \| end |
| 23 \| clustured_keywords.add(tmp) |
| 24 end |
| 25 return clustured keywords |

Figure 18:
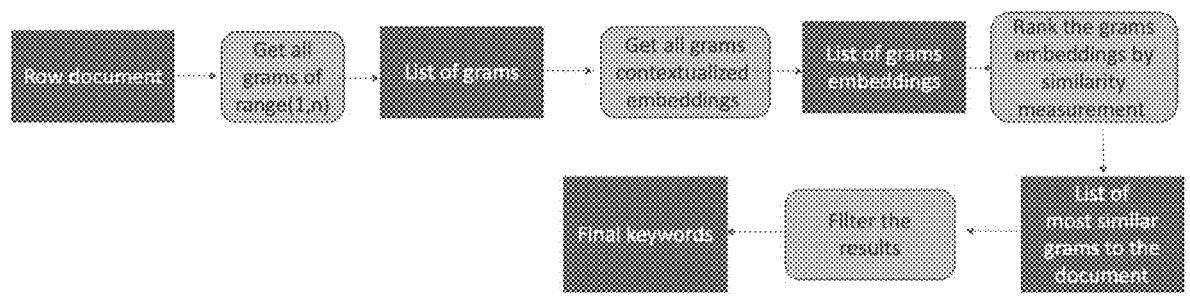
FIG. 18 illustrates an example of a ranking document grams.
Figure 34:
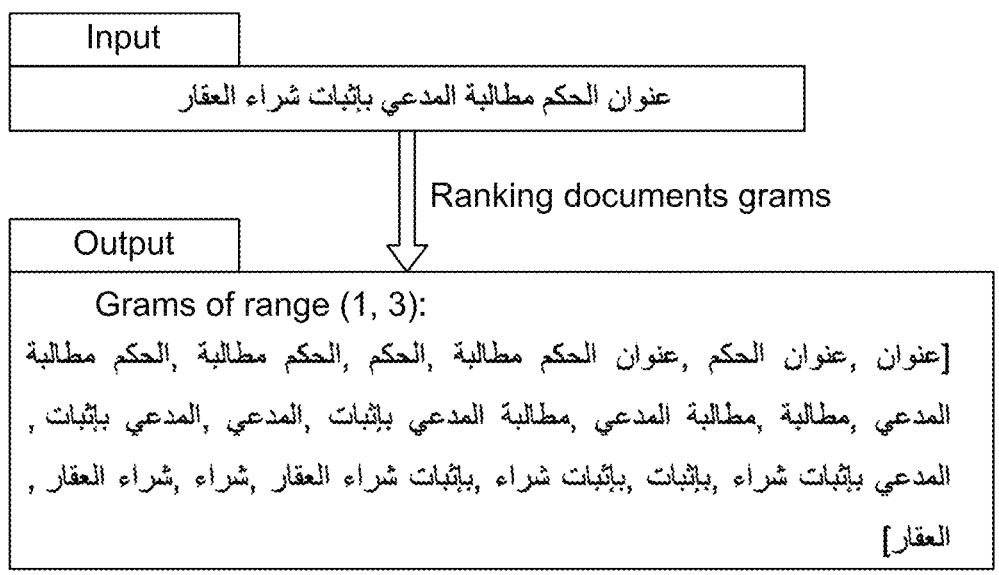
FIG. 34 shows an example of ranking documents.

FIGS. 18 and 34 illustrates the workflow of a ranking document grams, which get all grams Get all grams contextualized embeddings using a pre-trained deep encoders model. The result is a tensor with shape [num of grams, model hidden size]. Then, we rank the grams according to their similarity score to the document. After that, we filter them concerning three main criteria as follows:

Occurrences: The keyword term frequency in the document

Location: In the beginning, the middle, and the end of the document; For legal text, in the metadata of the case, in the verdict Attribute: Part of speech [verb, noun, adjective]

Length: NER [person-location-organization]

Semantic Search Engine

In an example, the entered query is encoded in vector representation (embeddings). Then, the resulting vectors are filtered out based on the extracted information: Named Entities and Keywords.

The candidate vectors are the result of building the query by combining the vectors with the extracted information. Therefore, all the ALC documents are converted only once into vectors by the encoder. Then, the search engine compares the document and query vectors by applying maximum sum similarity as shown in Equation 1:

Max Sum Similarity,            Equation 1

$$\text{candidates} = \text{combinations}(\text{argmax}_{Di \in D}(sim(Q, Di))[: 2 * top_n])$$

$$\text{argmin}(\text{sum}_{sim}(\text{candidates}, \text{candidates}))[: top_n]$$

let $c$ = candidates $$\text{sum}_{sim}(c, c) = \sum_{i=0}^{len(c)} \sum_{j=0}^{len(c)} c[i][j] \text{ if } i \neq j$$

In other examples, similarity function may be substituted for one of the following algorithms: euclidean_similarity, manhattan_similarity, nth_root, minkowski_similarity, square_rooted, cosine_similarity, and jaccard_similarity to calculate the semantic similarity score to find similar documents.

This process may be repeated for each document with the entered query. For example, the output may be a document with its similarity score, and the process may be repeated for each document to get top-k documents. The Similarity procedure computes the similarity between all pairs of (q,d), where is q: query and d: document.

The semantic search result may be a list of ranked documents based on the semantic similarity score against the entered query.

Figure 19:
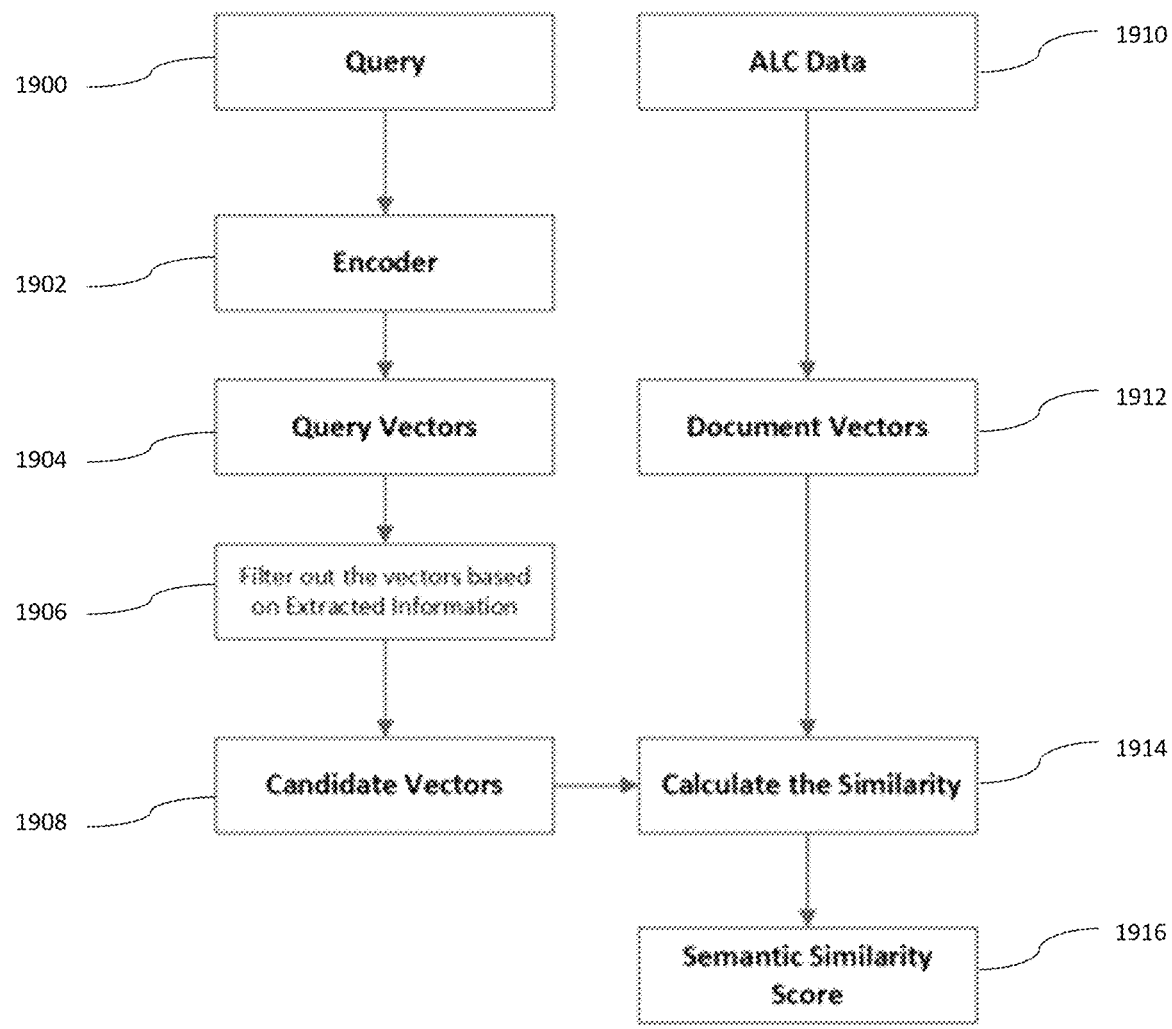
FIG. 19 illustrates an example of a semantic search engine.

FIG. 19 illustrates an example of a semantic search engine.

In FIG. 19, a query may be received by process 1900. The query may be pre-processed and classified. For example, an encoder 1902 may encode the output of query 1900. In process 1904, the encoder may convert the query into vectors. In process 1906, the vectors may be filtered based on the extracted information. For example, the extracted information may be named entities and keywords. Process 1908 determines candidate vectors. In process 1910, in an example, one or more documents of the ALC knowledge base may be selected to be compared against the entered query to find a similar match. In process 1912, an encoder may convert the documents in the knowledge base into vectors. In process 1914, similarity measurement algorithms may be used to compare the entered query against any one or any two or more of rules, frameworks, and legislations, ALC raw data, Sharia rulings, Quran, and Laws. In process 1916, a semantic similarity score is output based on the similarity measurement algorithms.

FIG. 19 illustrates an example of a Cross-Encoder being used for re-ranking.

Figure 20:
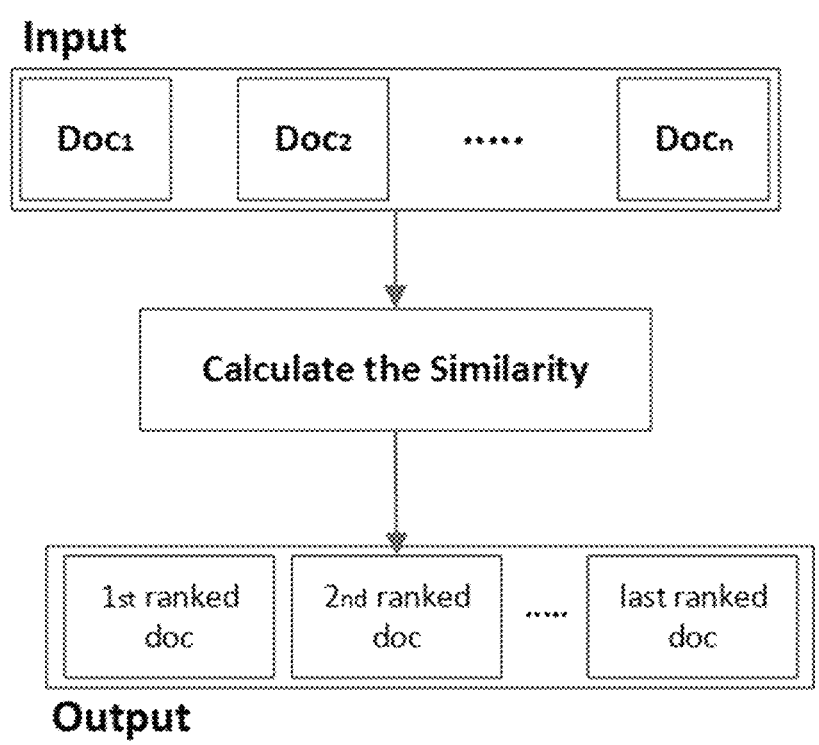
FIG. 20 illustrates an example of a Cross-Encoder being used for re-ranking.

A re-ranking technique may be applied to enhance the result using a cross-encoder that re-ranks the resulting document list. As shown in FIG. 20, Cross-Encoders may be used to score the pre-defined set of document pairs. For example, in a non-limiting example using 10 document pairs, similarity scores for these ten pairs may be determined using cosine-similarity to compare the document pairs and re-rank them based on the new scoring.

The semantic search may be based on deep bi-directional transformer auto-encoders.

Figure 21:
FIG. 21 illustrates an example of a search query.

FIG. 21 illustrates an example of a search query. FIG. 21 shows the interface of the search query. The user is free to choose where to search on BoG or MOJ cases, as well as the method of searching using a short or long query by attaching a .txt or .docx file with a maximum of 15 pages or 4500 words, and not more than 5 GB, for example. After entering the query, the user can choose the number of relevant legal cases to be shown (It starts with 10 and its multiples and ends with 100), or by default, it will be 10 cases. The entered query is classified into the main category as "عقد" and the subcategory as "بيع"

Figure 22:
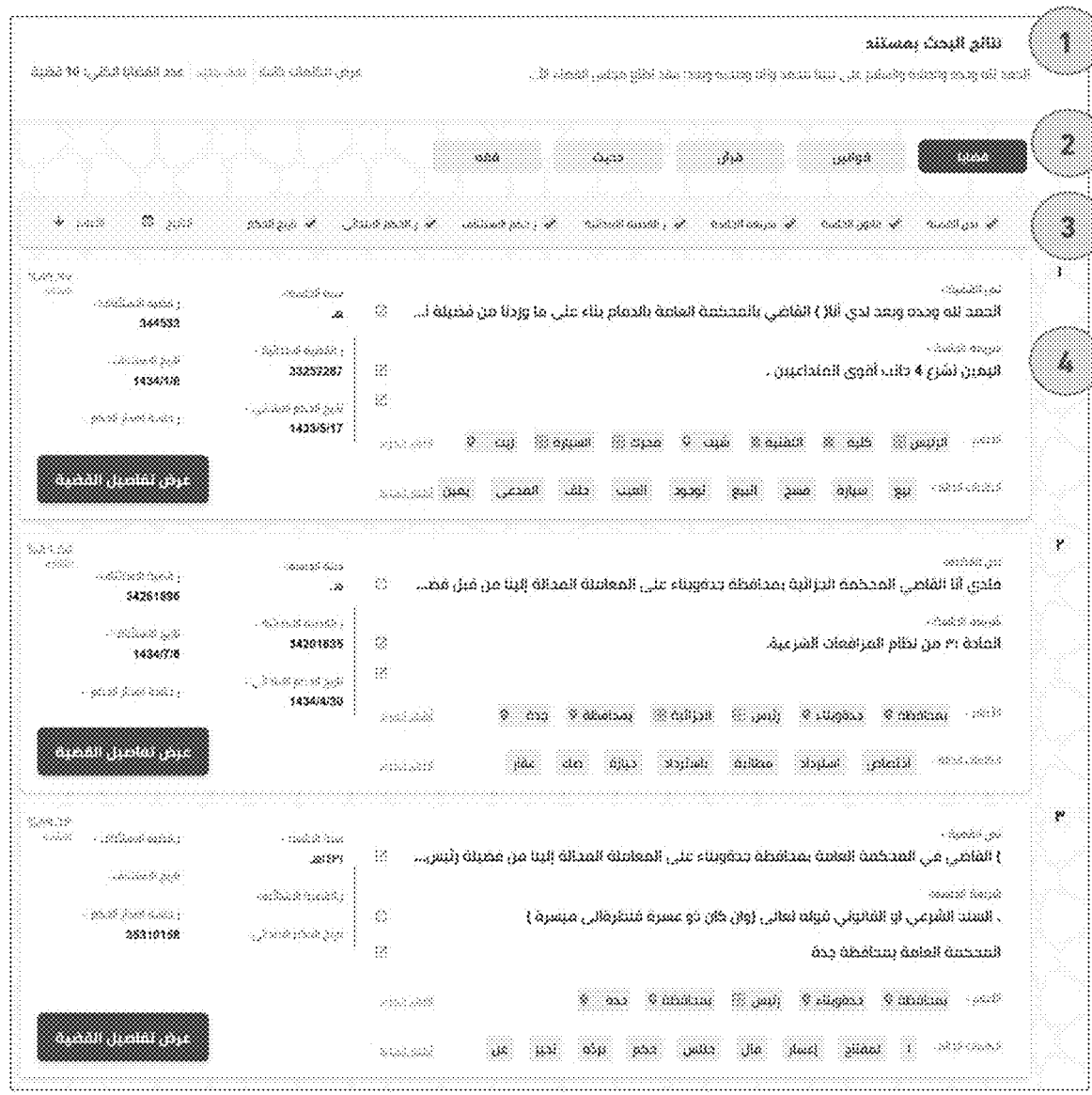
FIG. 22 illustrates an example of a search result list.

FIG. 22 illustrates an example of a search result list.

FIG. 22 shows an example of an interface of the search result list. The result of an example of searching by long document query is shown on a page divided into four primary sections. The first section includes the topic of the page, which refers to the search query, whether a short or long query. As well as a choice to view the whole query, the new search process, and the number of related legal cases. The second section consists of the tabs that enable the user to show the list of related cases, laws, ayah of Holy Quran and explanation, Hadith and explanation, and fiqh rules. The third section allows the user to show or hide some content of the related legal cases by checking or unchecking the checkboxes: case text, session rule, session legislation, initial case, appeal ruling, and initial judgment. Finally, the fourth section lists the cases in detail, with the ability to view each case on a separate page to view the whole text. In addition, it shows the similarity percentage of each case to the entered query.

Figure 23:
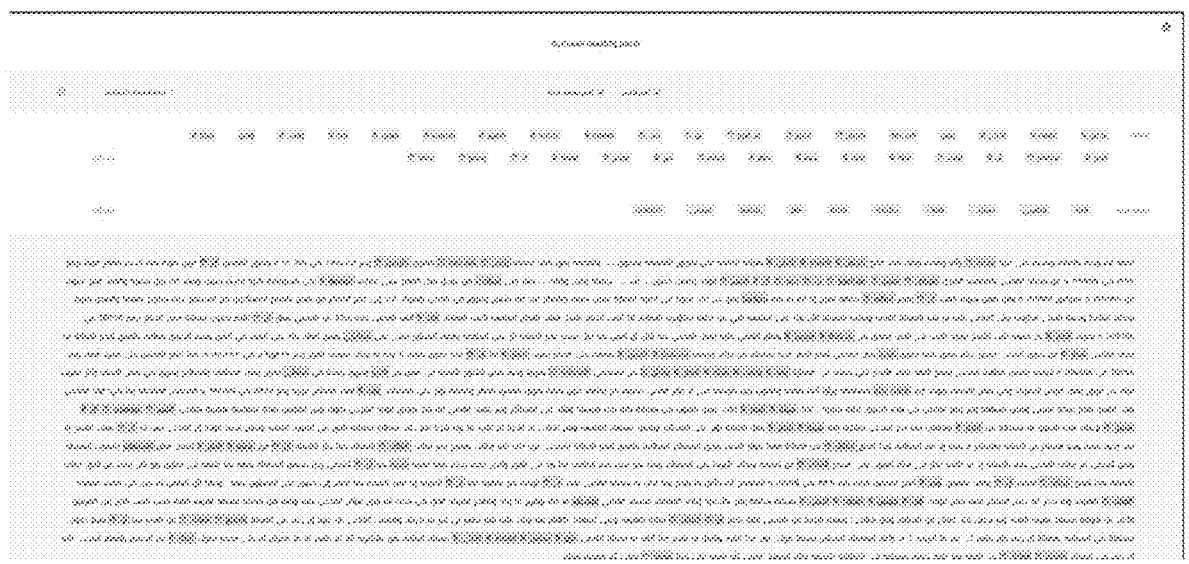
FIG. 23 illustrates the results of a long document search query—the full text of the entered query.

FIG. 23 illustrates the results of a long document search query—the full text of the entered query.

As shown in FIG. 23, the full text of the entered query can be shown by highlighting the keywords and named entities. The same thing with each resulting document is shown in FIG. 23.

Figure 24:
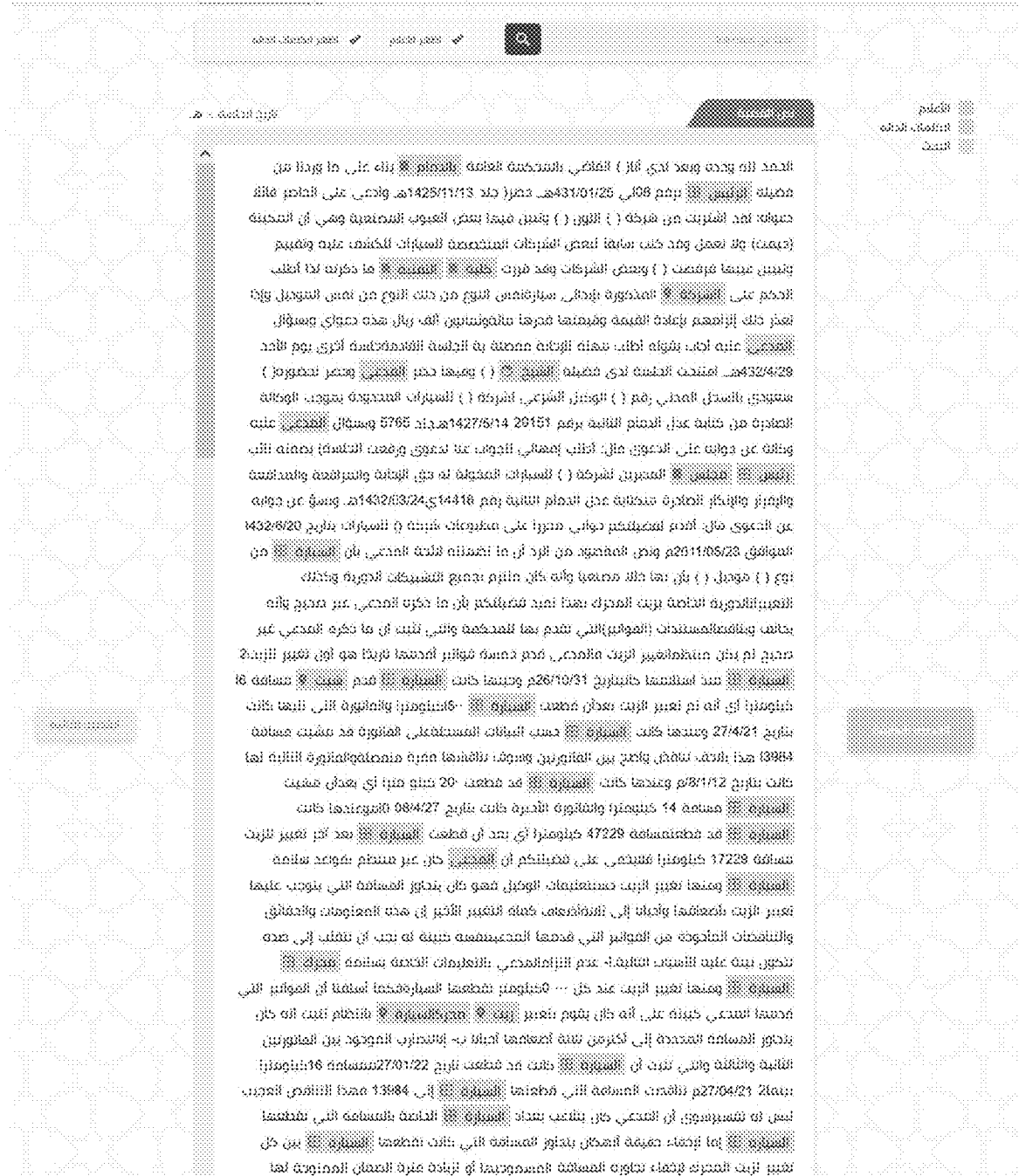
FIG. 24 illustrates the results of a long document search query—the full text of one of the result's documents.

FIG. 24 illustrates the results of a long document search query—the full text of one of the result's documents.

This section will show an example of long documents as a search query.

FIG. 25 are diagrams of an example of searching by a long document query.

As shown in FIG. 25, the text of the lengthy document query and desired points of the query are based on contextual meaning. For example, this query is searching for BoG cases. The result will be a list of 10 documents. The result is based on the desired points extracted from the case according to the contextual meaning and the extracted information; keywords and named entities. Therefore, 1st ranked document is similar to the entered query, and re-ranked as the 1st document.

Figure 26:
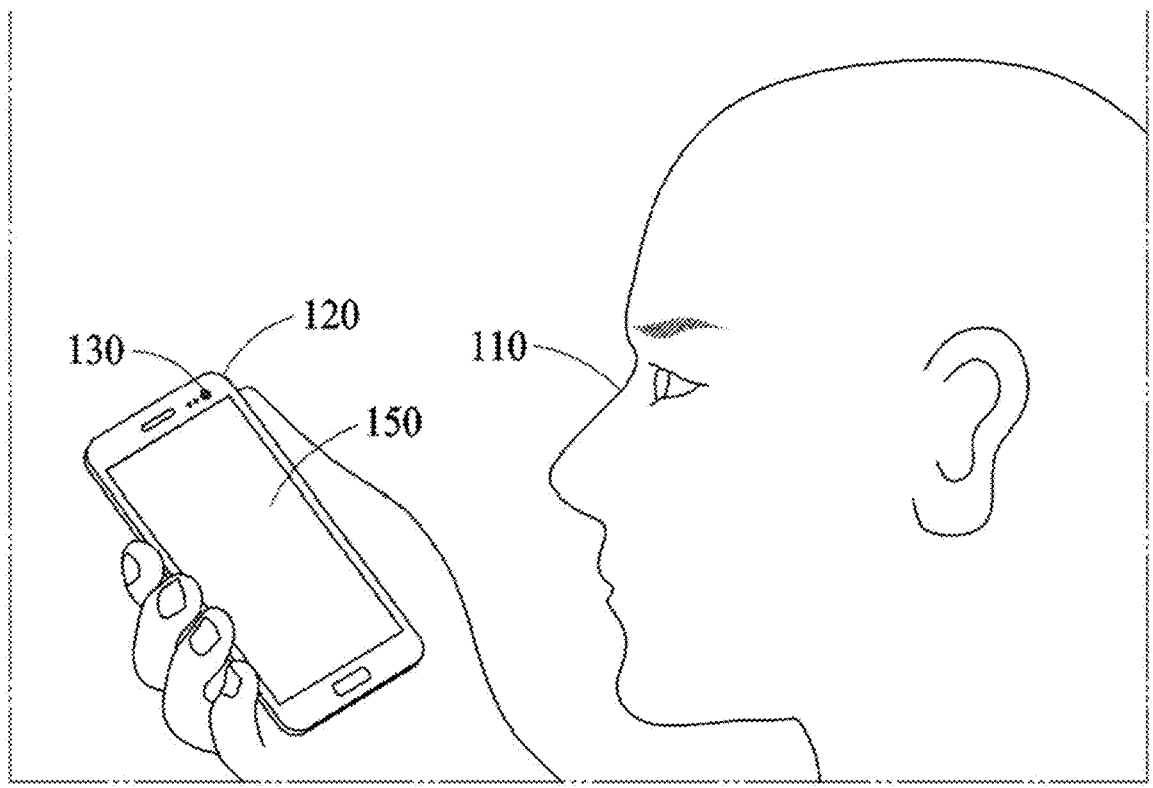
FIG. 26 illustrates an example of an electronic device.

FIG. 26 illustrates an example of an electronic device comprising an information extraction and semantic searching system 100, e.g., as an example smartphone, and a user 110 using the smartphone 120, microphone 130, and display 160.

As a non-exhaustive example only, a search engine apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The search engine apparatus, modules and methods in FIGS. 1-26 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-26 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for search of Arabic legal cases implemented in hardware or in a combination of hardware and software, the apparatus comprising:
   a memory storing a knowledge base maintaining a plurality of Arabic law documents and a connection layer configured to establish logical relationships between the Arabic law documents and knowledge entities;
   an interactive display device configured to input a query comprising a long query or a short query of Arabic text;
   one or more processors configured to:
   receive the input query;
   extract Arabic legal text data from the received query to generate extracted information, the Arabic legal text data comprising prefixes, stems, and suffixes utilizing a morphological analysis algorithm based on a predefined Arabic-English lexicon, the predefined Arabic-English lexicon comprising morphological compatibility tables for prefix-stem combinations and stem-suffix combinations;
   segment the received query into sentences extracted from Arabic legal texts, wherein each of the sentences does not exceed a predetermined token limit;
   determine semantic importance of the sentences extracted using a deep learning model comprising multiple layers of bidirectional transformer encoders;
   select key sentences of the sentences extracted based on determined semantic relevance scores of the sentences extracted, relative to the Arabic legal text data, to generate a classified query;
   parse the classified query by removing duplicated white spaces, unwanted characters, and normalizing numerals;
   extract, using a language model, a named entity and a keyword from the received query to generate extracted information;
   convert the classified query and the extracted information into a dense vector representation by removing duplicated white spaces, unwanted characters, and normalizing numerals;
   determine a similarity match of the Arabic legal cases between the dense vector representation and a document vector representation of the plurality of Arabic law documents and logically related knowledge entities stored in the knowledge base, the Arabic law documents comprising Arabic legal documents, legislative laws, Fiqh texts, Quran, Hadith texts, royal decrees, Arabic Legal Content (ALC) raw data, and Sharia ruling documents; and
   the interactive display device configured to display a Arabic document, or the plurality of Arabic documents, as a result of the similarity match;
   wherein the knowledge base further comprises a database schema configured to store and organize the Arabic law documents into structured tables, and the connection layer configured to establish relationships between different tables in the knowledge base.

2. The apparatus of claim 1, wherein the one or more processors are further configured to:

collect raw data and explanations of the Quran from online sources;

parse the raw data of the Quran into chapters using a predetermined phrase;

bind determined verses of the chapters to corresponding verse explanation of the explanations of the Quran from the online sources; and convert the Quran, the Hadith texts, and the bound determined verses of the chapters into document vector representation.

3. The apparatus of claim 2, wherein the predetermined phrase comprises "In the name of Allah, the Merciful".

4. The apparatus of claim 1, wherein at least one of the one or more classification models comprises a segmentation layer configured to segment and output sentences of the long query into context sentences.

5. The apparatus of claim 1, wherein at least one of the one or more classification models comprises a semantic layer configured to determine and output similarity matches between sentences of the long query.

6. The apparatus of claim 1, wherein the one or more processors are further configured to extract the keyword by segmenting the long query into word groups with a predetermined number of words to generate word candidates;

embed the word candidates and compare their proximity to embeddings of the long query; and generate the extracted information based on a result of the comparison.

7. The apparatus of claim 1, further comprising a memory configured to store instructions;

wherein the one or more processors are further configured to execute the instructions to configure the one or more processors to extract the named entity and the keyword from the received query to generate the extracted information, classify the received query to generate the classified query, convert the classified query and the extracted information into the dense vector representation, determine and output the similarity match between the dense vector representation and the document vector representation of the knowledge base.

8. The apparatus of claim 1, wherein the long query has a maximum of 4500 words or 15 pages of texts, and the short query comprises a specific word.

9. The apparatus of claim 1, wherein the named entity comprises any one or any two or more of "Legal Bond-Hadith," "Legal Bond-Quran," "Legal Bond-jurisprudence," "Law," "Occupation," "Organization," "person," "Address," "Documents," "Verdict," "Accusation," "Evidence," "Citation," "period," "currency," "nationality," "amount," and "date".

10. The apparatus of claim 1, wherein the language model comprises a named entity recognition model comprising a first layer, a second layer, and a third layer, and wherein the first layer comprises pre-trained models, the second layer comprises a fully connected linear layer configured to receive an output of the pre-trained models, and the third layer is a conditional random fields (CRFs) layer configured to receive an output of the second layer.

11. The apparatus of claim 1, wherein the classified query comprises a case category and a case class subcategory that is a subdivision of the case category.

12. The apparatus of claim 1, wherein the keyword comprises any one of "themes and facts," or "the circuit ruled".

13. The apparatus of claim 1, wherein the a database schema comprises:

a case identification table, configured to store metadata, comprising case IDs, categories, subcategories, texts, verdicts, rules, summaries, audit verdict numbers, audit verdict dates, hearing dates, verdict numbers, and verdict dates;

a Quran table, comprising surah names, surah types, ayah numbers, ayah texts, and corresponding verse explanations;

Hadith table, comprising hadith numbers, book names, narrators, hadith texts, and corresponding explanations from Fateh Albari; and laws Tables, comprising law names, article numbers, article texts, publication dates, release dates, statuses, and system text headers.

14. The apparatus of claim 1, wherein the connection layer comprising:

a refrencedBy relationship linking the Arabic legal documents to related Quranic verses of the Quran, the Hadith texts, and Fiqh tests cited as evidence or a reference;

a controlledBy relationship linking the Arabic legal documents to relevant legislative laws, regulations, and frameworks;

an entityBasedSimilarity relationship clustering documents based on shared named entities comprising organizations, locations, and persons;

a topicBasedSimilarity relationship clustering documents based on similarity of topics and key themes; and a partOf Relationship connecting specific articles and sections of the legislative laws, the Quranic verses, and the Hadith texts to their respective sources.

15. The apparatus of claim 1, comprises a case identification table, configured to store metadata, comprising case IDs, categories, subcategories, texts, verdicts, rules, summaries, audit verdict numbers, audit verdict dates, hearing dates, verdict numbers, and verdict dates, a Quran table, comprising surah names, surah types, ayah numbers, ayah texts, and corresponding verse explanations;

Hadith table, comprising hadith numbers, book names, narrators, hadith texts, and corresponding explanations from Fateh Albari, and laws Tables, comprising law names, article numbers, article texts, publication dates, release dates, statuses, and system text headers, and wherein the connection layer comprises a refrencedBy relationship linking the Arabic legal documents to related Quranic verses of the Quran, the Hadith texts, and Fiqh tests cited as evidence or a reference, a controlledBy relationship linking the Arabic legal documents to relevant legislative laws, regulations, and frameworks, an entityBasedSimilarity relationship clustering documents based on shared named entities comprising organizations, locations, and persons, a topicBasedSimilarity relationship clustering documents based on similarity of topics and key themes, and a partOf Relationship connecting specific articles and sections of the legislative laws, the Quranic verses, and the Hadith texts to their respective sources.

16. A computer-implemented Arabic search method implemented in hardware or in a combination of hardware and software, the method comprising:

receiving inputting, by an interactive display device, a query comprising Arabic text;

extracting, using one or more language models, Arabic legal text data from the received query to generate extracted information, the Arabic legal text data comprising prefixes, stems, and suffixes utilizing a morphological analysis algorithm based on a predefined Arabic-English lexicon, the predefined Arabic-English lexicon comprising morphological compatibility tables for prefix-stem combinations and stem-suffix combinations;

segmenting the received query into sentences extracted from Arabic legal text data, wherein each of the sentences does not exceed a predetermined token limit;

determining semantic importance of the sentences extracted using a deep learning model comprising multiple layers of bidirectional transformer encoders;

selecting key sentences of the sentences extracted based on determined semantic relevance scores of the sentences extracted, relative to the Arabic legal text data, to generate a classified query;

parsing the classified query by removing duplicated white spaces, unwanted characters, and normalizing numerals;

extracting, using a language model, a named entity and a keyword from the received query to generate extracted information;

converting the classified query and the extracted information into a dense vector representation by removing duplicated white spaces, unwanted characters, and normalizing numerals;

determining a similarity match of Arabic legal cases between the dense vector representation and a document vector representation of a plurality of Arabic documents and logically related knowledge entities stored in a knowledge base, the Arabic documents comprising Arabic legal documents, legislative laws, Fiqh texts, Quran, Hadith texts, royal decrees, Arabic Legal Content (ALC) raw data, and Sharia ruling documents, wherein the received query comprises one of a long query of facts of a legal case and a short query of facts of an Arabic legal case, and wherein in response to the received query comprising the long query, the long query does not include a punctuation mark; and displaying, by the interactive display device, an Arabic document, of the plurality of Arabic documents, as a result of the similarity match;

wherein the knowledge base further comprises a database schema configured to store and organize the Arabic law documents into structured tables, and the connection layer configured to establish relationships between different tables in the knowledge base.

17. A non-transitory computer-readable storage medium storing instructions that, when executed by one or more processors, configure the one or more processors to perform the method of claim 16.

* * * * *